US007370284B2

(12) United States Patent
Andrea et al.

(10) Patent No.: US 7,370,284 B2
(45) Date of Patent: May 6, 2008

(54) USER INTERFACE FOR DISPLAYING MULTIPLE APPLICATIONS

(75) Inventors: Peter Andrea, Oakland, CA (US); J. Bret Simister, San Francisco, CA (US); David T. Temkin, San Francisco, CA (US)

(73) Assignee: Laszlo Systems, Inc., San Mateo, CA (US)

( * ) Notice: Subject to any disclaimer, the term of this patent is extended or adjusted under 35 U.S.C. 154(b) by 679 days.

(21) Appl. No.: 10/717,221

(22) Filed: Nov. 18, 2003

(65) Prior Publication Data

US 2005/0108655 A1 May 19, 2005

(51) Int. Cl.
*G06F 13/00* (2006.01)
*G06F 15/00* (2006.01)

(52) U.S. Cl. ...................................... 715/788; 715/805

(58) Field of Classification Search ........ 715/788–789, 715/809, 854, 800–801, 815, 804–805, 765
See application file for complete search history.

(56) References Cited

U.S. PATENT DOCUMENTS

| | | | | |
|---|---|---|---|---|
| 5,513,342 | A | 4/1996 | Leong et al. | |
| 5,689,665 | A * | 11/1997 | Mitsui et al. | 715/803 |
| 6,108,714 | A * | 8/2000 | Kumagai et al. | 719/310 |
| 6,473,102 | B1 | 10/2002 | Rodden et al. | |
| 6,950,993 | B2 * | 9/2005 | Breinberg | 715/801 |
| 7,013,431 | B2 * | 3/2006 | Taylor et al. | 715/788 |

* cited by examiner

*Primary Examiner*—Cao (Kevin) Nguyen
(74) *Attorney, Agent, or Firm*—Vierra Magen Marcus & DeNiro LLP

(57) ABSTRACT

Multiple applications are displayed. A request to change a display of a first application is received. A determination is made regarding how displays for one or more other applications should change in response to changing the display of the first application in order to avoid conflict with the display of the first application. The display of the first application is changed. The one or more displays for the one or more other applications are automatically changed in response to changing the display of the first application in order to avoid conflict with the display of the first application.

55 Claims, 25 Drawing Sheets

30 40 42 24 26 20 32 34 22

30 40 42 20 24 26 32 34 22

30 40 42 20 24 26 32 34 22

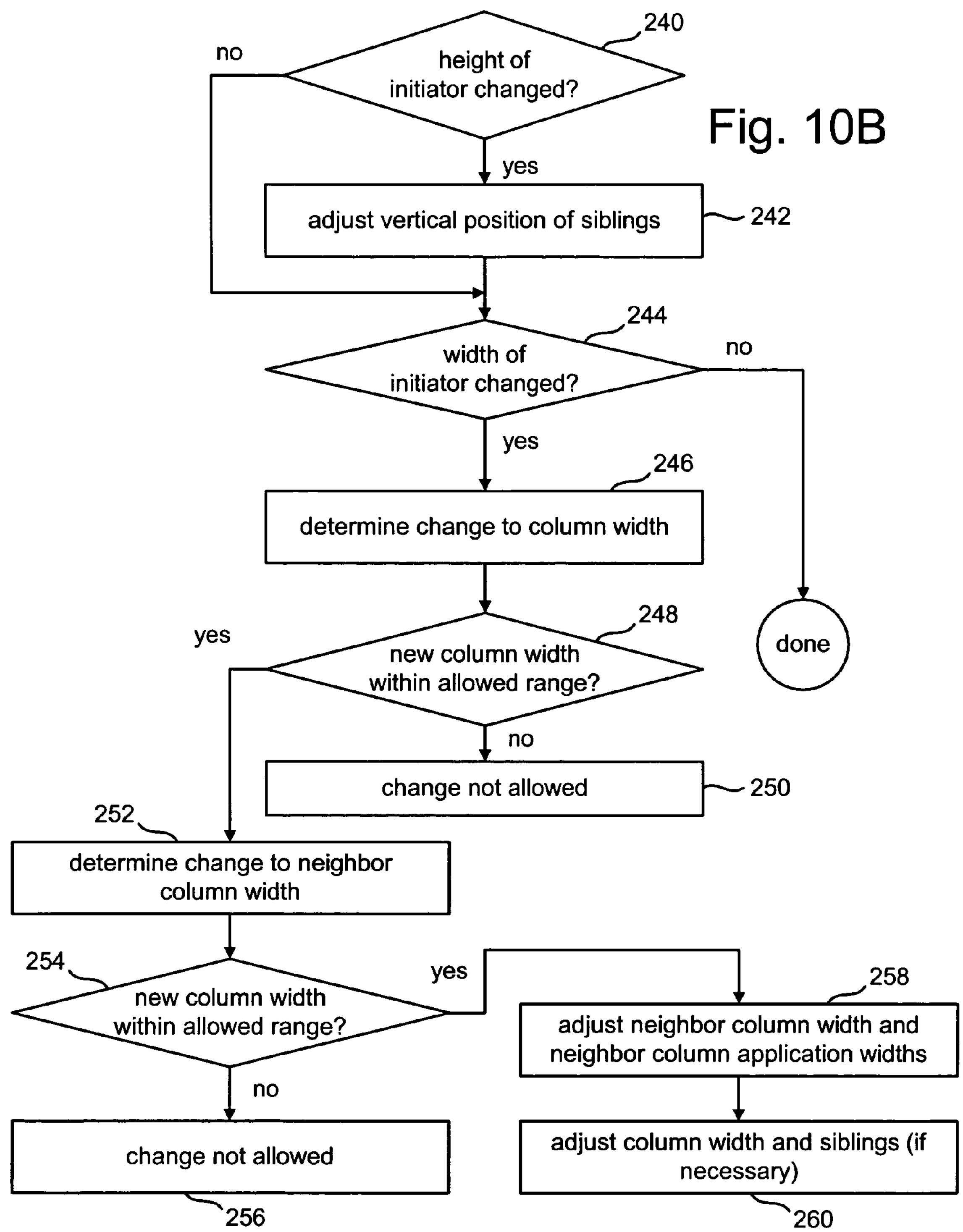
Fig. 10B
240
height of initiator changed?
no
yes
adjust vertical position of siblings
242
244
width of initiator changed?
no
yes
246
determine change to column width
248
new column width within allowed range?
yes
no
done
change not allowed
250
252
determine change to neighbor column width
254
new column width within allowed range?
yes
no
258
adjust neighbor column width and neighbor column application widths
change not allowed
256
adjust column width and siblings (if necessary)
260

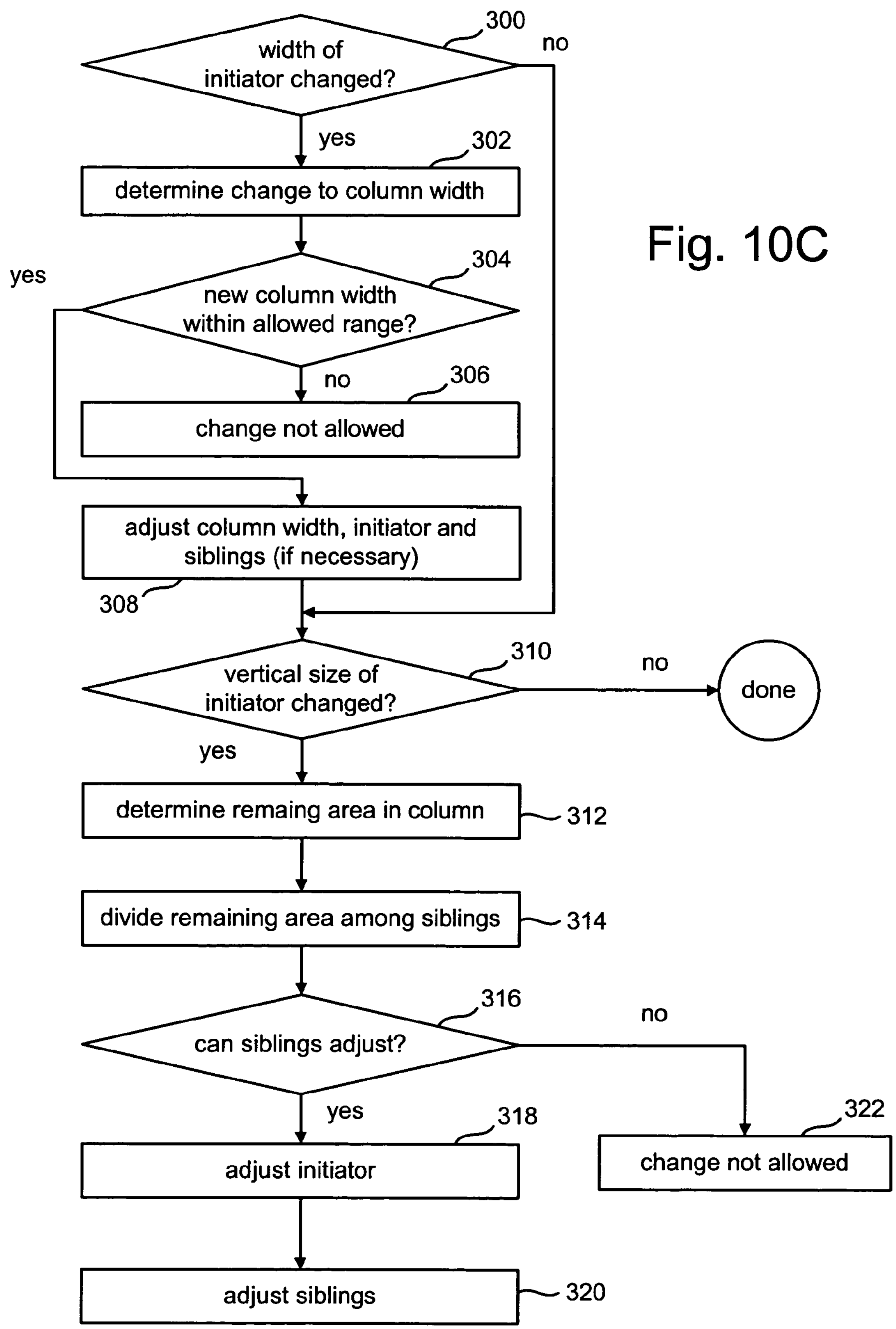

width of initiator changed?
300
no
yes
determine change to column width
302
Fig. 10C
yes
new column width within allowed range?
304
no
change not allowed
306
adjust column width, initiator and siblings (if necessary)
308
vertical size of initiator changed?
310
no
done
yes
determine remaing area in column
312
divide remaining area among siblings
314
can siblings adjust?
316
no
yes
adjust initiator
318
change not allowed
322
adjust siblings
320

Part 1

Part 2 group relationships reel layout

USER INTERFACE FOR DISPLAYING MULTIPLE APPLICATIONS

BACKGROUND OF THE INVENTION

1. Field of the Invention

The present invention is directed to technology for displaying multiple applications.

2. Description of the Related Art

As computers become more powerful and software becomes more sophisticated, users of computers are increasingly taking advantage of a computer's ability to run multiple applications at the same time. For example, a user may open multiple windows on a desktop, with each window running one or more applications. Alternatively, one window may be opened on a desktop, with the one window running a first application. Multiple other applications can then be run within the first application. One such example of the latter is if a user runs a web browser and multiple applications are run from within the web browser.

One problem with running multiple windowed applications on a computer is that the display area where the multiple applications are displayed can be come too crowded. For example, if there are multiple wind applications open, one or more applications may obscure other applications. When a user attempts to access an application, the user may need to first find the display for that application, change its size, manually change the size of other applications or move the other applications. It is often difficult to view multiple applications at the same time.

Thus, there is a need to better manage the user interface for multiple applications sharing a display area.

SUMMARY OF THE INVENTION

The present invention, roughly described, pertains to technology for displaying multiple applications in a display area. The multiple applications share a display area. If one application changes, one or more of the other applications are automatically adjusted accordingly. For example, in one implementation, if one application is made larger, other applications will shrink and/or move accordingly.

In one embodiment, a system for performing the present invention includes displaying a set of applications, where the set of applications includes at least a first application and a second application. A display for the first application is changed. A display of the second application is automatically changed in response to the changing of the display for the first application. In different implementations, the display for the second application may change before, after or during the changing of the display for the first application.

In another embodiment, multiple applications are displayed. A request to change a display of a first application is received. A determination is made regarding how displays for one or more other applications should change in response to changing the display of the first application in order to avoid conflict with the display of the first application. The display of the first application is changed. The displays for the one or more other applications are automatically changed in response to the request to change the display of the first application in order to avoid conflict with the display of the first application.

In one embodiment, a first application is said to be in conflict with a second applications if the display of the first application overlaps with the display of the second application. In other embodiments, applications can be configured to allow some overlap but not others. For example, a second application may be configured to allow its lower fifteen pixels to be overlapped. If the change to the first application only overlaps the lower fifteen pixels of the second application, then there is no conflict. If the change to the first application overlaps more than the lower fifteen pixels of the second application, then there is a conflict. In other embodiments, different criteria can be used to determine whether there is a conflict between applications.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing device) and/or communication interfaces (e.g. network cards, wireless transmitter/receivers, etc.).

These and other objects and advantages of the present invention will appear more clearly from the following description in which the preferred embodiment of the invention has been set forth in conjunction with the drawings.

BRIEF DESCRIPTION OF THE DRAWINGS

FIGS. 10A-10J depict flow charts describing various embodiments of a process for determining how a change of an application effects other applications.

DETAILED DESCRIPTION

Figure 1:
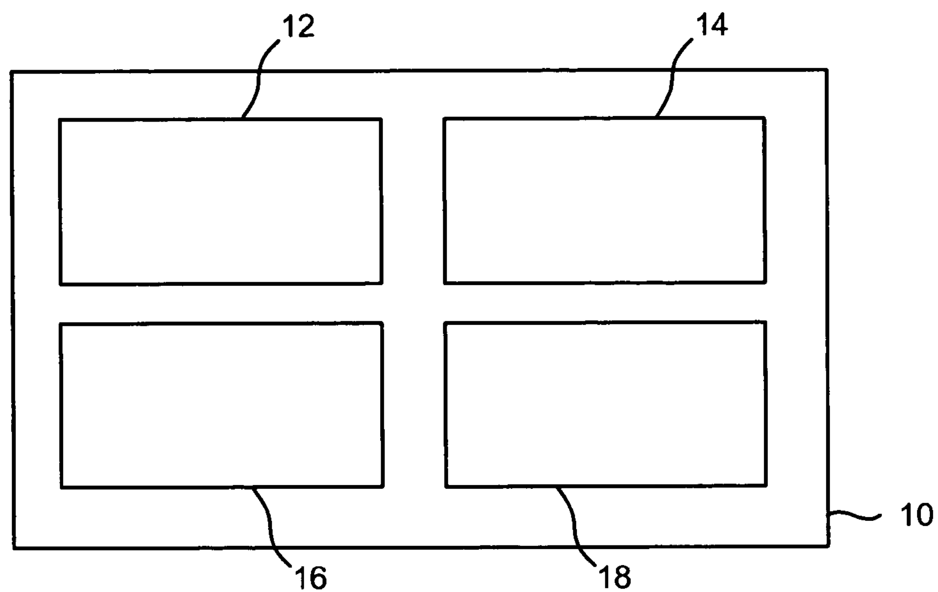
FIG. 1 depicts a set of applications being displayed.

The present invention pertains to technology for displaying multiple applications in a display area. If one application changes, one or more of the other applications are adjusted accordingly. In one embodiment, the system strives to maintain a non-overlapping relationship between applications within the display area. For example, consider FIG. 1, which depicts display area 10. In one embodiment, display area 10 is a window, desktop or other type of display area depicted on a monitor or screen of a computing device. Within display area 10 are four applications running, including applications 12, 14, 16 and 18. During the use of those applications it is contemplated that user may wish to change the sizing, position or rotation of one application. For example, a user may drag a corner of an application in order to resize the application, drag a side of the application to resize the application, drag an entire application to move the application, type in new dimensions, type in new coordinates for positioning the application, etc. Consider a situation when a user wishes to resize application 12. The present invention allows one or more of the other applications to be automatically resized or moved in response, in order to accommodate the resizing of application 12 so that application 12 does not overlap with any other applications. The term "overlap" is used to indicate that the display (e.g. window) for an application is on top of or underneath the display for another application. FIG. 2 shows one example of what happens, according to one embodiment of the present invention, if application 12 is resized to become bigger. In this example, application 14 has its width reduced, application 16 has its height reduced and application 18 has its height reduced. As an application changes size, its content may adapt. For example, an image may be resized and/or have its resolution changed, text may wrap or an arrangement of items in a display may change.

In one embodiment, applications may overlap under certain circumstances. For example, a first application may permit a certain area (e.g. leftmost ten pixels, top six pixels, etc.) to be overlapped while other areas cannot by overlapped. If a second application changes in a manner that causes that second application to overlap with an area of the first application that is allowed to be overlapped, then there is no conflict and the first application need not be adjusted. If the second application changes in a manner that causes that second application to overlap with an area of the first application that is not allowed to be overlapped, then there is a conflict and the first application should be adjusted to avoid the unwanted overlap.

Figure 3:
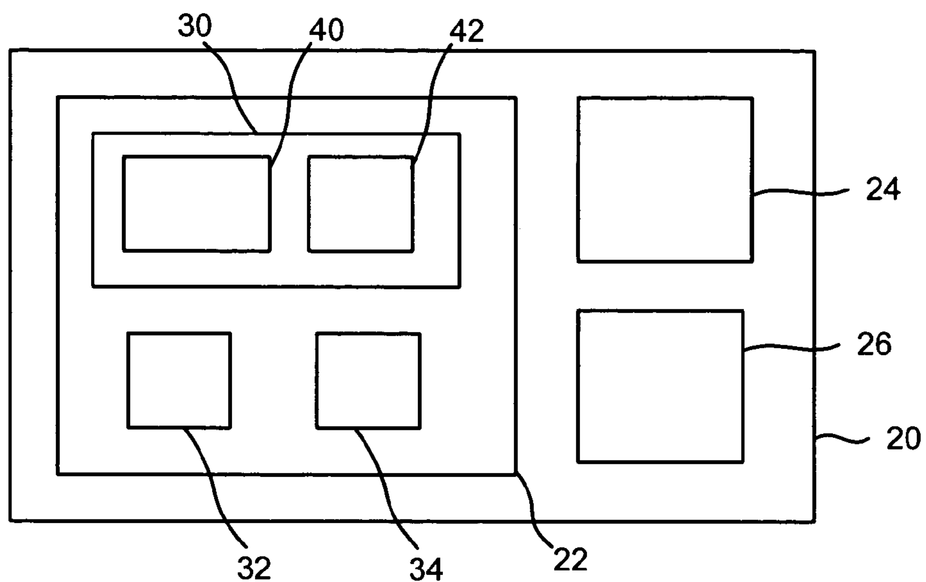
FIG. 3 depicts a set of applications being displayed.

FIG. 3 shows display area 20, which includes one or more applications embedded in and displayed within other applications. For example, display area 20 includes applications 22, 24 and 26. Within application 22 are applications 30, 32 and 34. Within application 30 are applications 40 and 42. Embedding applications forms a hierarchy of applications. When an application changes, other applications at the same level of hierarchy are adjusted accordingly. In some embodiments, when an application changes, applications at other levels of the hierarchy can also be adjusted accordingly.

Figure 4:
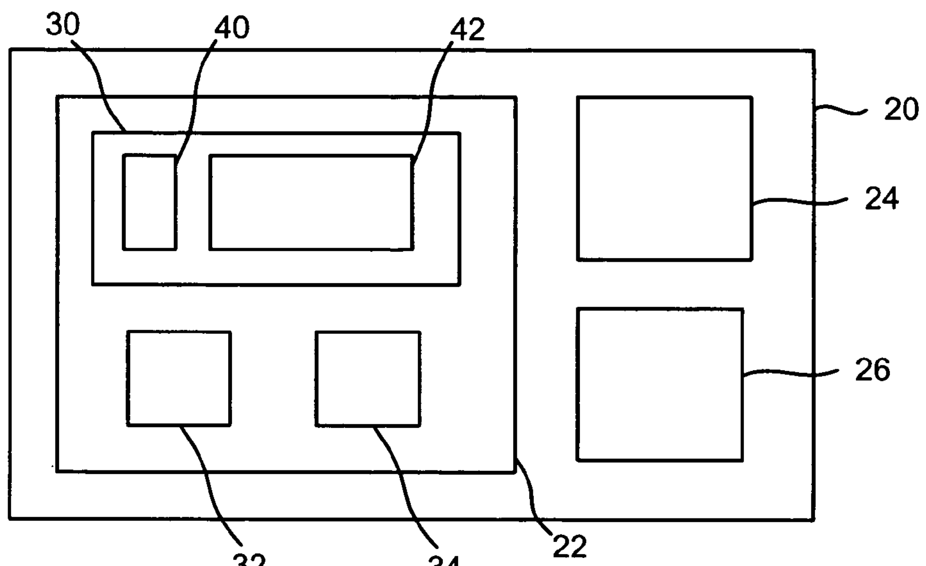
FIG. 4 depicts the applications being displayed in FIG. 3, after changes are made.
Figure 5:
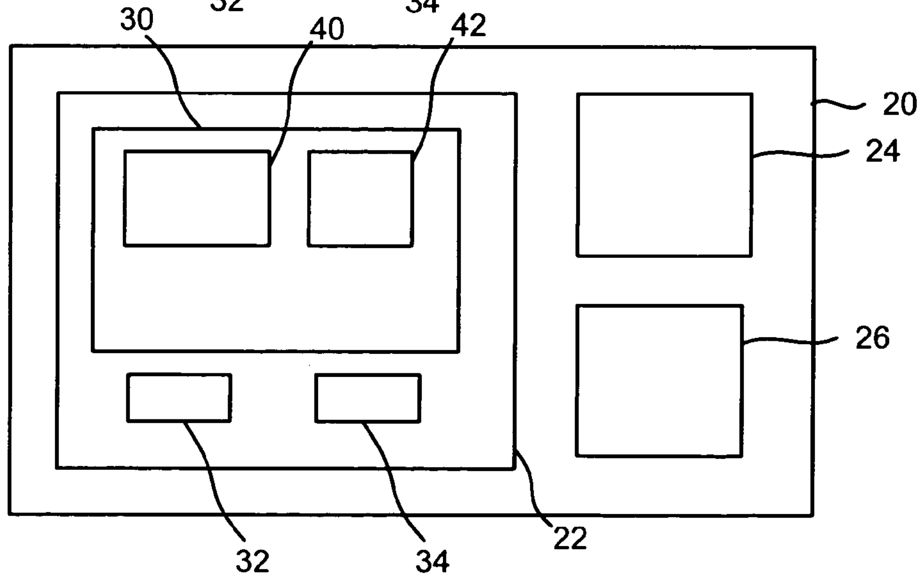
FIG. 5 depicts the applications being displayed in FIG. 3, after changes are made.

In one, example, display area 20 is an application (e.g. a window, browser, dashboard, etc.). If application 22 were to change in size, position or rotation, applications 24 and 26 may, possibly, change accordingly in response thererto. Similarly, if application 42 were to change in size (e.g. get bigger or smaller, move in X or Y direction) then application 40 may also change accordingly. For example, FIG. 4 shows display area 20 after application 42 is enlarged in its width dimension. Accordingly, application 40 has been automatically made smaller in its width dimension to accommodate the increase in size of application 42. FIG. 5 shows display area 20 after application 30 was made larger in its length dimension. In response to the increase in size of application 30, applications 32 and 34 were automatically made smaller in their length dimension. Note that FIG. 5 shows that applications 40 and 42 are not enlarged when application 30 is enlarged. In other embodiments, applications 40 and 42 can be made larger to take advantage of the extra room within application 30.

FIGS. 1-5 show basic functionality provided by the present invention. That is, as one application is changed (or requested to change), other applications are automatically adapted. This allows a user to manage multiple applications on a display area. For example, if a user is interested in a particular application, the user can make that particular application larger so that the user can interact with that application. While that application is larger, other applications are made smaller so that the display area is not cluttered.

For purposes of this document, an application is defined as any stand-alone piece of functionality that can be viewed, modified, or interacts with a set of data. Applications allow dimensional transformation. In some embodiments, applications can have a minimum size. Applications may be grouped with, embedded in, or contain other applications. Examples of applications include a image editing application, a calendar application, news-providing application, an email application, a word processing application, a spreadsheet application, an Internet browsing application, etc. In some embodiments, a portion of a display area can utilize the present invention while other portions of the display area will not use the present invention.

Figure 2:
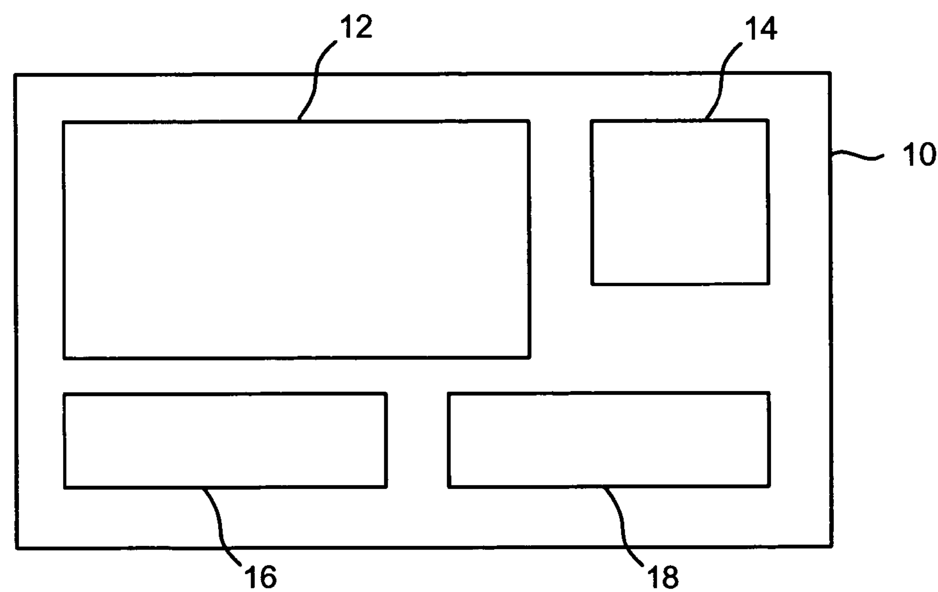
FIG. 2 depicts the applications being displayed in FIG. 1, after changes are made.
Figure 6:
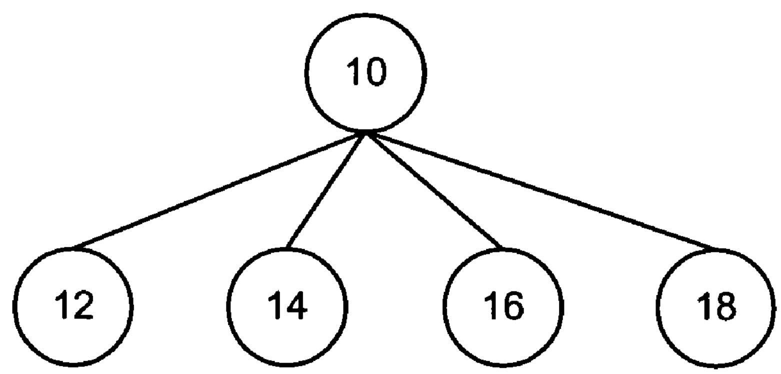
FIGS. 6 and 7 depict hierarchies of applications.

FIG. 6 depicts a hierarchy of applications corresponding to FIG. 1. That is, the hierarchy includes two levels. At the top level is application 10. At the second level are applications 12, 14, 16 and 18. Thus, applications 12-18 are embedded within application 10.

Figure 7:
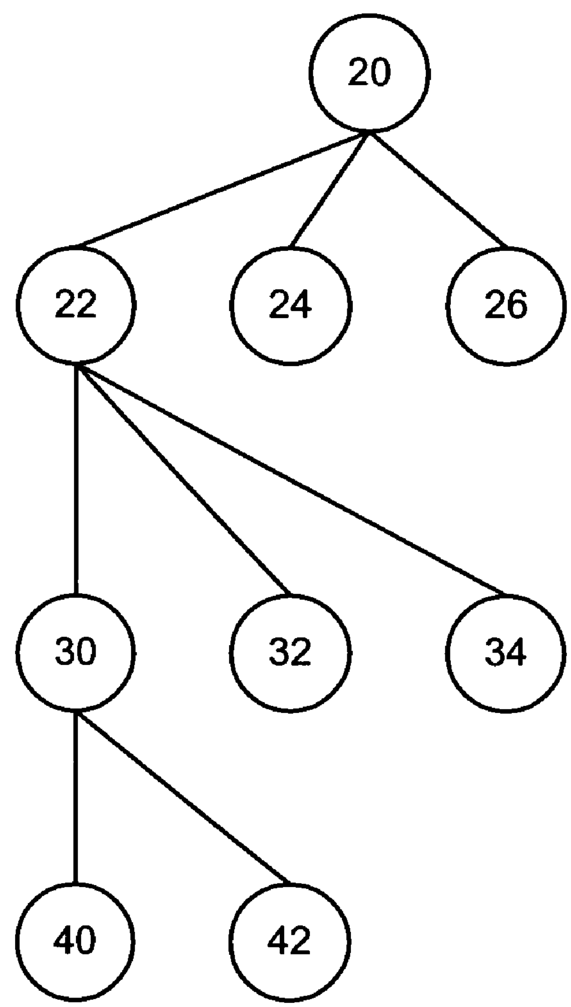

FIG. 7 provides an example of a hierarchy which corresponds to FIGS. 3-5. The hierarchy of FIG. 7 includes four levels. At the top level is application 20, which serves as a display area. At the second level of hierarchy are applications 22, 24, and 26. Applications 22-26 are within application 20. At the third level of the hierarchy are applications 30, 32 and 34, all of which are displayed within application 22. At the fourth level of the hierarchy are applications 40 and 42, both which are displayed within application 30. In one embodiment of the present invention, at any level within the hierarchy, an application strives to maintain a non-overlapping relationship with its siblings. Siblings are other applications at the same level of the hierarchy. For example, in one embodiment the system attempts to prevent application 30 from overlapping with applications 32 and 34. Similarly, the system seeks to prevent application 22 from overlapping with applications 24 and 26.

User interaction with the dimensional parameters (width, height, position, rotation, others) of an application initiates a reactive process within the hierarchy. The application which is the subject of the requested change becomes the "initiator" and communicates its intentions to change to its parent application. The parent application is the application immediately above the initiator in the hierarchy. For example, the parent for applications 40 and 42 is application 30; the parent application for applications 30, 32 and 34 is application 22; and the parent applications for applications 22-26 is application 20. The parent application will become a mediator upon learning that the initiator intends to change. The parent application will assess the initiator's request in relationship to the initiator's siblings and, in some embodiments, itself. If the change is allowed, the initiator then sets its dimensional parameters to its new values. The parent causes adjustment of the sibling's dimensional parameters in response. The parent may also adjust its own dimensional parameters. This is a real-time process and the negotiations with the parent transpire as the action upon the initiator is occurring, creating a seamless interaction (with or without animation) for the user between the modified application and its adjacent applications.

Figure 8:
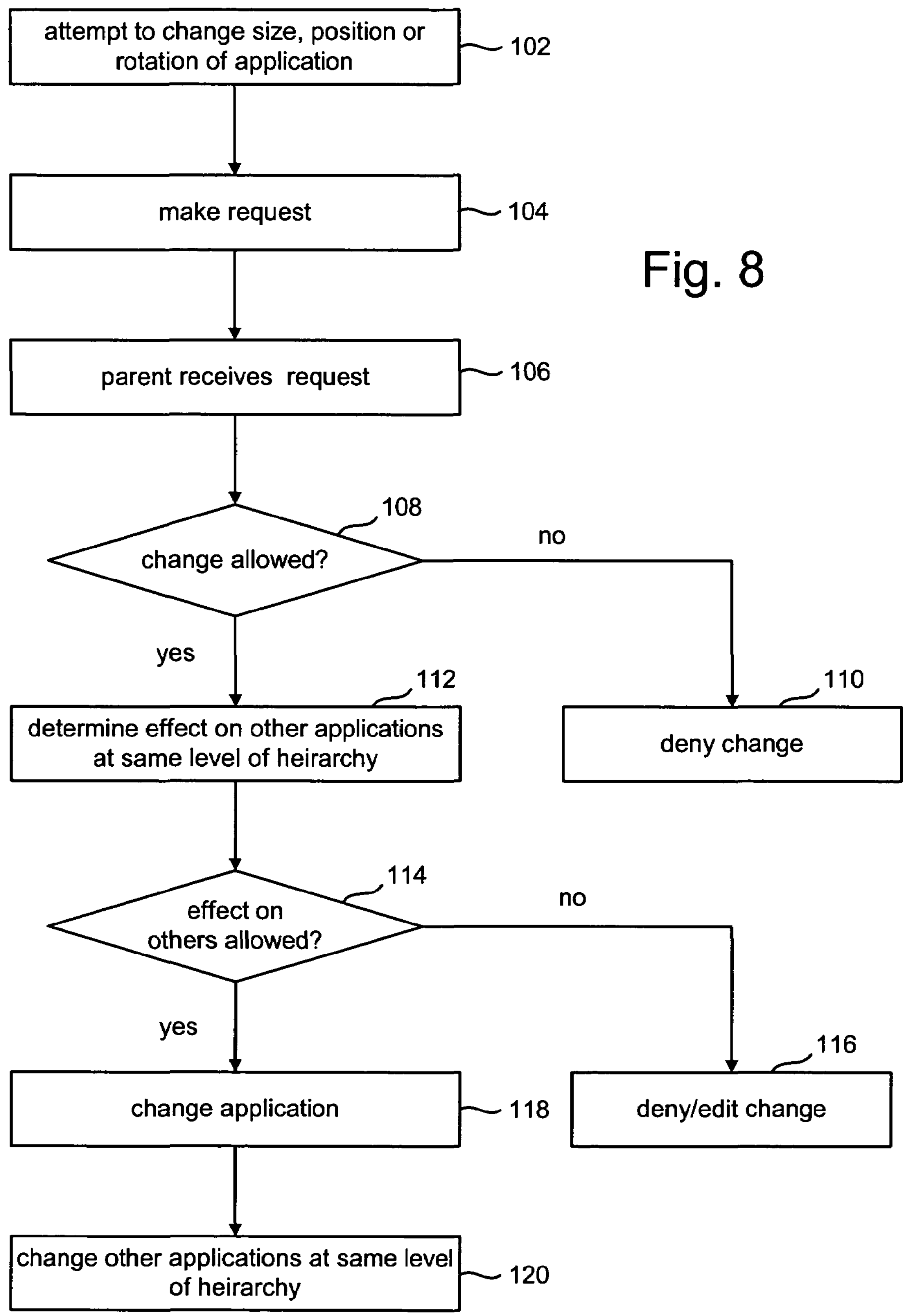
FIG. 8 depicts a flow chart describing one embodiment of a process for changing how applications are displayed.

FIG. 8 is a flowchart describing one embodiment of a process for managing how applications are displayed according to the present invention. In step 102, an attempt is made to change the size, position or rotation of an application. As described above, this can include an operator using a mouse to resize an application by dragging a corner, side or other portion of a window or other interface item. In another embodiment, an operator can type in new dimensions or a new position. The attempt to change the size or position will cause a request to be made in step 104. In one embodiment, the request can include any one or more of the following various events: on X (change in X position), on Y (change in Y position), on Width (change in width), on Height (change in height), on Delete, onInsert, on Click (mouse button click), as well as others specific to a particular implementation. The event will include information about the application generating the event, the changes requested within the event (old values, new values and/or differential values) and the type of event. The request is received by the parent application in step 106. In step 108, it is determined whether the change is allowed. In one embodiment, a set of pre-defined rules can be used to define what changes can be made to an application. The parent can determine whether the changes are acceptable within these predefined rules. In other embodiments, the application requesting the change may determine on its own whether it can be changed accordingly. Examples of rules can include rules that an application must have a minimum size or maximum size. Additionally, a rule can bound the position of an application to certain portions of the display area. If the change is not allowed, then the change is denied and the process of FIG. 8 is completed without making the change (step 110).

If the change is allowed, then in step 112, the effect of the change on other applications at the same level of hierarchy is determined. A negotiation occurs, which can result in acceptance, denial, or adjustment depending on the specifics of the request and the tolerances of the application receiving the request, as well as the parent. Each of these entities can change their size/position/rotation as a result of the request. This process can go up the parent chain (up levels of hierarchy) as well as down the chain. In some embodiments, the change can effect applications on different levels of the hierarchy. In step 114, it is determined whether the effect on other applications at the same level of hierarchy is allowed. If the effects of the change to others are not allowed, then that change is denied in step 116. For example, if increasing application 12 (see FIG. 1) causes application 16 to become too small (because application 16 has a minimum size), then the change to application 12 may be denied. If the effect on other applications is allowable, then the initial application sought to be changed is changed in step 118 and the appropriately effected applications at the same level of hierarchy are changed in step 120. Note that step 120 can be performed before, after or during step 118. In another embodiment, step 118 can be performed earlier in the process of FIG. 8.

Figure 9:
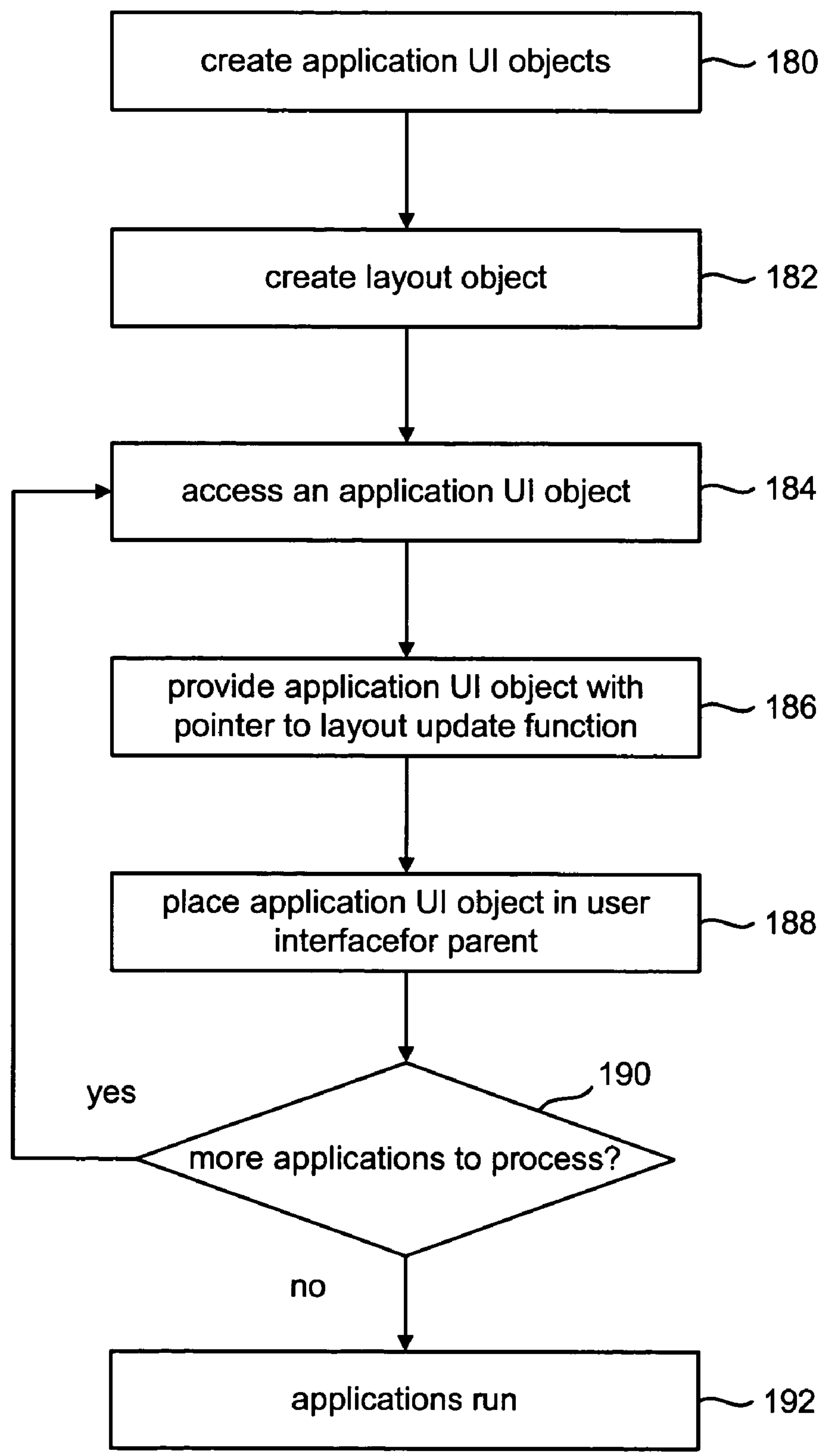
FIG. 9 depicts a flow chart describing one embodiment of a process for starting applications.

FIG. 9 provides a flowchart describing one embodiment of a process for starting one or more applications. In step 180, application UI (user interface) objects are created for each application to be displayed. In other embodiments, different entities (other than objects) can be created for each application. In step 182, a layout object is created. The layout object is an object associated with an application that is responsible for displaying all information within that application. Thus, for every application that has other applications embedded within it, the layout object will describe how the embedded applications are displayed within the parent application. For example, looking at the hierarchy in FIG. 7, application 22 will have a layout object describing how applications 30, 32 and 34 are displayed within application 22. Other embodiments of the present invention do not use a layout object. In step 184, a UI object for a particular application is accessed. In step 186, a parent application for the application to which UI object was accessed in step 184 provides a pointer to the application UI object. This pointer will reference a function of the layout object for the parent. The application receiving the pointer will store the pointer. When an application has a change in its size or position (or other display property), then the application will call the function referenced by the received pointer. That function referenced by the pointer will be within the layout object. The called function will receive information about the event generated. The application which received the pointer is placed in the user interface for the parent in step 188. For example, step 188 could include (see FIG. 3) inserting application 42 within application 30. In step 190, it is determined whether there are more applications to process. In one embodiment, steps 184-188 are performed for each application to be displayed. If there are more applications to process, then the method continues at step 184. If there are no more applications to process, then in step 192 the applications are run by the computing device(s).

FIGS. 10A-10J depict flowcharts describing various embodiments of a process for determining how a change of an application affects other applications and, possibly, how to make the responsive changes to those other applications. Although specific examples are provided in FIG. 10A-10J, the concepts described therein can be applied to other layouts.

Figure 10A:
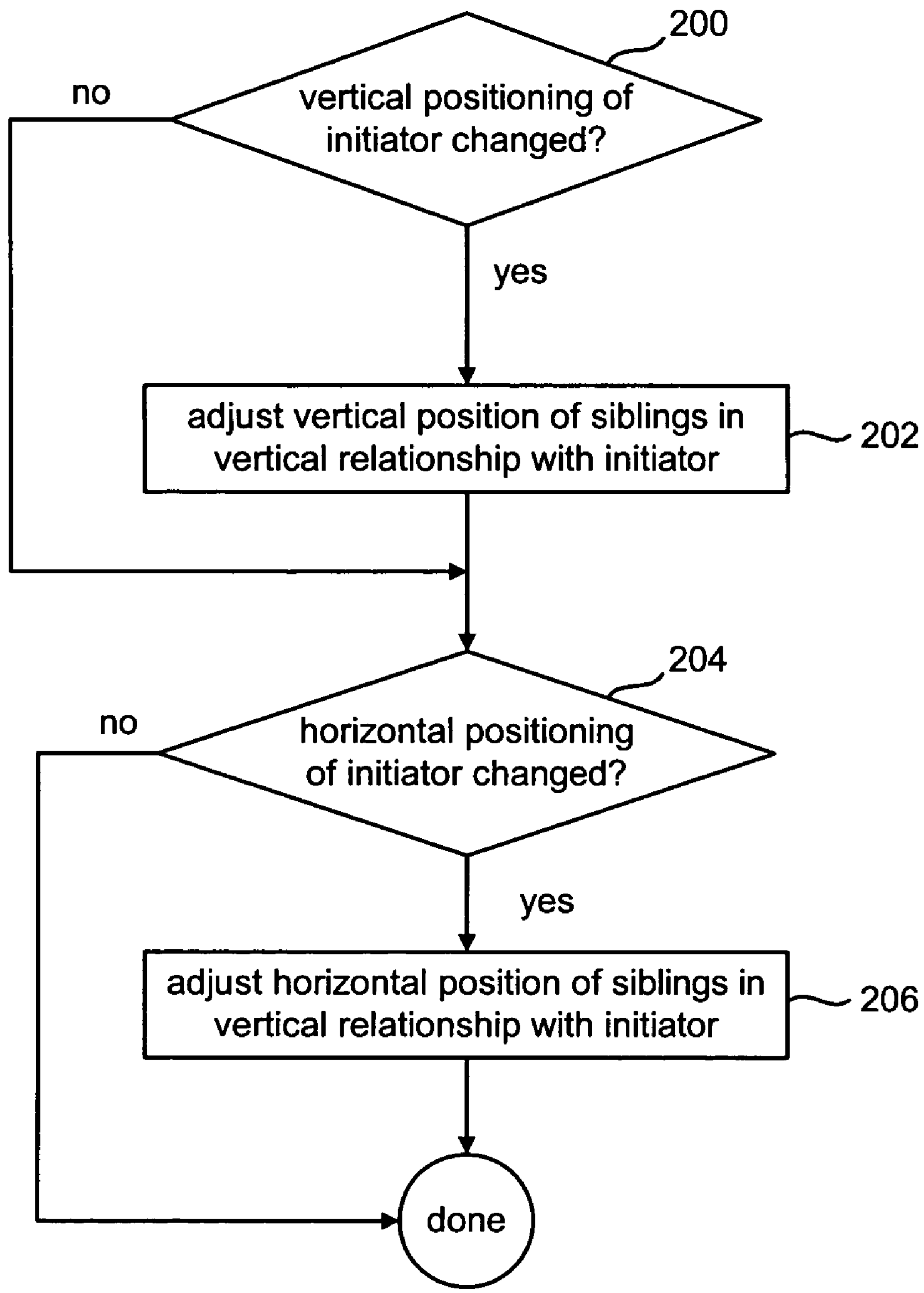
Figure 11A:
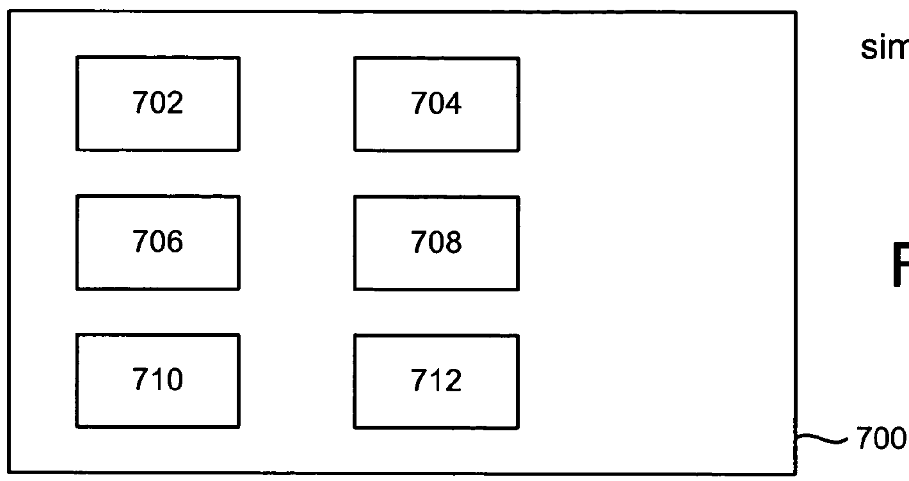
FIGS. 11A-11T depicts various displays of applications before and after changes to the applications.
Figure 11B:
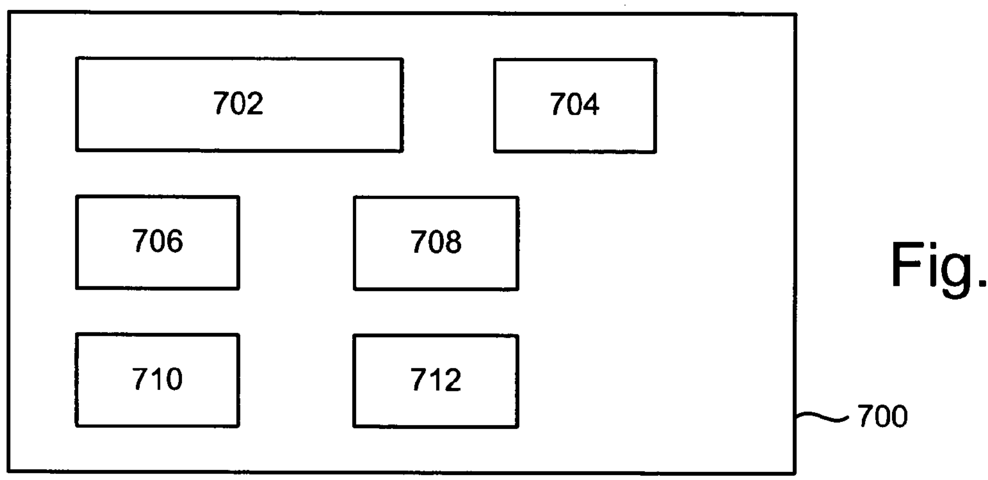

For example, FIG. 10A provides a flowchart describing one embodiment of a process for a simple layout. A simple layout may have a display area depicting a set of applications with no horizontal or vertical restrictions. In some embodiments, simple layouts may have minimal spacing requirements between applications. Other embodiments may also include minimum sizes and/or maximum sizes for applications. FIG. 11A provides an example of a simple layout. FIG. 11A shows display area 700 having six applications: 702, 704, 706, 708, 710 and 712. Each of the six applications can be resized vertically or horizontally. Each of the six applications can also be moved in the horizontal or vertical directions.

Figure 11C:
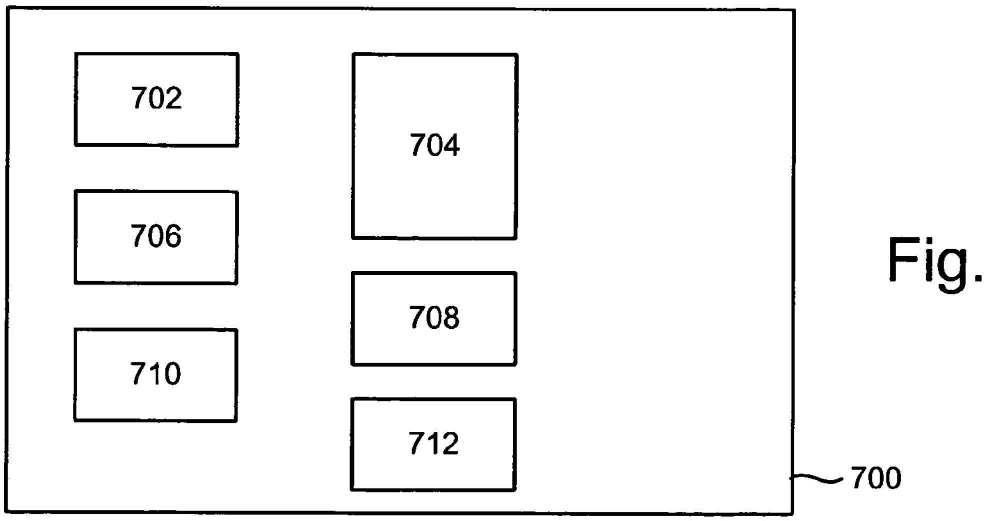

In step 200 of FIG. 10A, it is determined whether the vertical positioning (size or location) of the initiator application is changed (or requested to be changed). In response to the application being changed (or requested to be changed), siblings at the same level of the hierarchy that are in vertical relationship with that application may automatically have their vertical position adjusted in step 202. A vertical relationship refers to applications which are neighbors, above or below each other, or have an effect on each other if one of them changes its vertical dimensions. For example, FIG. 11C shows that if application 704 expands in the vertical dimensions, then applications 708 and 712 will be affected in step 202. Application 708 is a neighbor to application 704 in the vertical dimension. In some embodiments, expanding application 704 will only affect application 708. In other embodiments, expanding application 704 will affect applications 708 and 712. There are various ways to affect the other siblings at the same level of hierarchy. In one embodiment, only the neighboring application is made smaller to accommodate an application being made bigger. In other embodiments, all of the applications in the vertical relationship will be made smaller on an equal, pro-data basis. In the embodiment of FIG. 11C, the siblings 708 and 712 are moved rather than resized. After step 202, or after step 200 if no vertical position has changed, the system determines whether the horizontal positioning (size or location) of the initiator application is being changed. If not, the process of FIG. 10A is completed. If so, then in step 206, the siblings that are in a horizontal relationship with the initiator have their horizontal positioning (size or location) changed. A sibling with a horizontal relationship with the initiator is a sibling who is either a neighbor in the horizontal dimension or otherwise will be affected by a change in the horizontal dimension of the initiator. For example, FIG. 1B shows that if application 702 is expanded in the horizontal dimension, its neighbor application 704 will be affected. Step 206 includes adjusting the position of application 704 without changing its size.

Figure 11D:
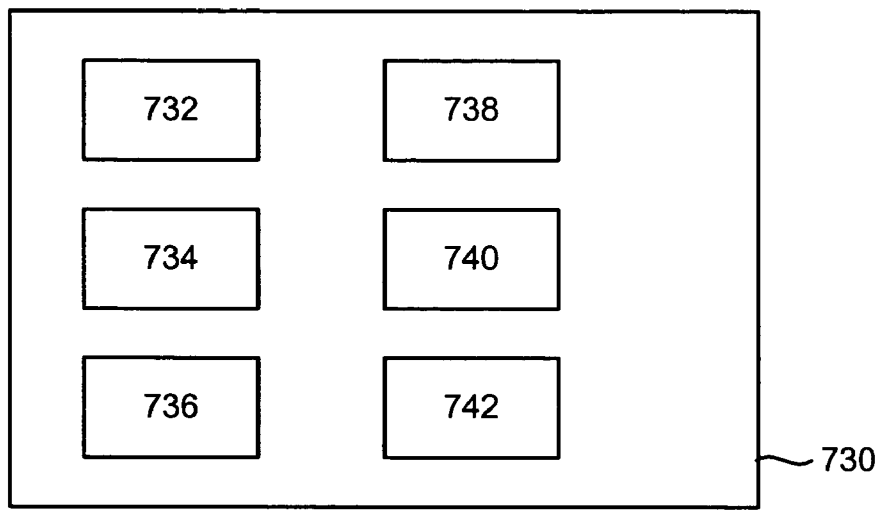
Figure 11E:
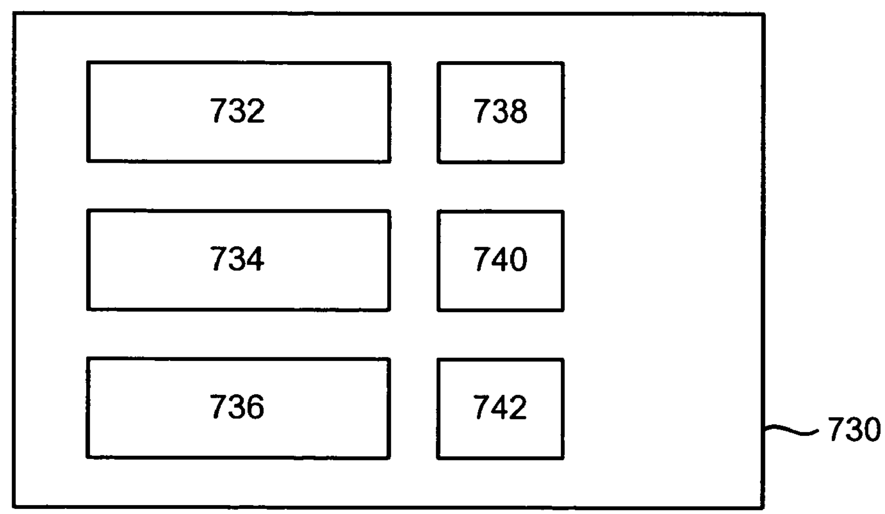

FIG. 10B provides a flowchart describing a system where the applications are arranged in multiple columns and the display area is not fixed in the height dimension. For example, FIG. 11D shows a display area 730, which includes applications 732, 734, 736, 738, 740 and 742 displayed in two columns. The first column includes applications 732, 734 and 736. The second column includes applications 738, 740 and 742. If an application in a particular column is expanded in the height dimension, then the applications above and below will be moved, as depicted in FIG. 11C. If an application had its width increased or decreased, the entire column will be increased and decreased, thereby, causing all of the applications within that column to have their width decreased and increased as depicted in FIG. 11E. That is, FIG. 11E shows that application 732 has been expanded in the horizontal direction. Applications 732 and 736 have also been expanded in response because they are in the same column as application 732. In response to the first column being expanded, the second column (which includes applications 738, 740 and 742) has been made narrower and all the applications within that column were also made narrower.

In step 240 of FIG. 10B, it is determined whether the height of the initiator has changed. The initiator is the application for which the requested change was received for in step 102 of FIG. 8. If the height of the initiator is requested to change, then in step 242, the vertical position of all the siblings in the same column are changed as depicted in FIG. 11C. If the height of the initiator has not changed (or after step 242), then in step 244 the system determines whether the width of the initiator has changed. If not, the process of FIG. 10B is completed.

If the width of the initiator has changed, then in step 246, it is determined how big the column width needs to be in order to have minimum spacing between applications. In step 248, it is determined whether the column width is within the allowed range. That is, in some embodiments, there is a minimum and maximum column width allowed. If the new column width is not within the allowed range, then none of the changes to the initiator or its siblings are allowed to be performed (step 250). If the new column width is within the allowed range, then in step 252 the system determines what change needs to be made to the neighboring column's widths. That is, if the first column's width has been made larger, the neighboring columns need to be made smaller. In some embodiments, the display area (e.g. display area 730) is a fixed display area in its width. Therefore, if one column is made larger, other columns have to be made smaller. Similarly, if some columns are made smaller, other columns have to be made larger. In step 254 the system determines whether the new neighboring column is within the allowed range (e.g., within minimum width and a maximum width). If the new column width for the neighboring column is not within an acceptable range, then none of the changes are allowed (step 256). If the new column width for the neighboring column is within an acceptable range, then in step 258 the neighboring column's width is adjusted and all of the applications in the neighboring column have their width adjusted to the new column width. In step 260, the column that includes the initiator application is also adjusted. The initiator application, as well as its siblings, have their widths adjusted to the new column width in step 260. For example, FIG. 730 shows the first column with applications 732, 734 and 736 becoming wider, while the second column with applications 738, 740 and 742 becomes narrower.

Figure 11F:
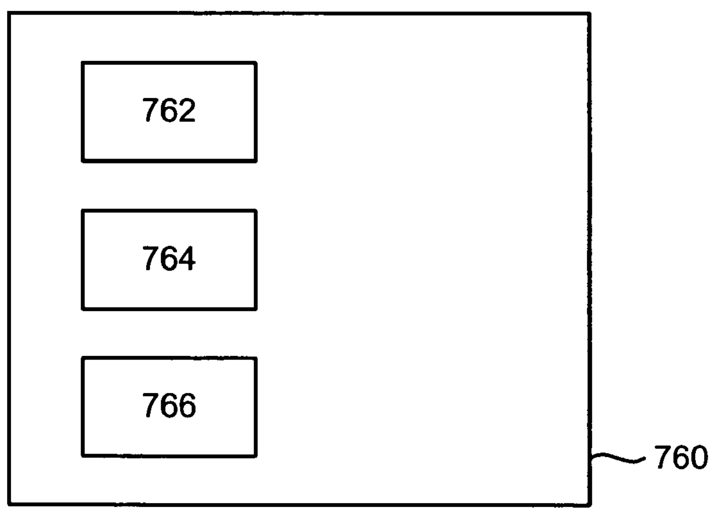

FIG. 10C is a flowchart describing one embodiment of the process for a display area having a single column, where the display area has a fixed set of dimensions or at least a fixed vertical dimension (height). For example, FIG. 11F shows display area 760 having three applications 762, 764, 766 arranged in a single column. The size of display area 760 cannot be changed. Display area 760 also includes a minimum spacing between the edge of the display area and between each application.

Figure 11G:
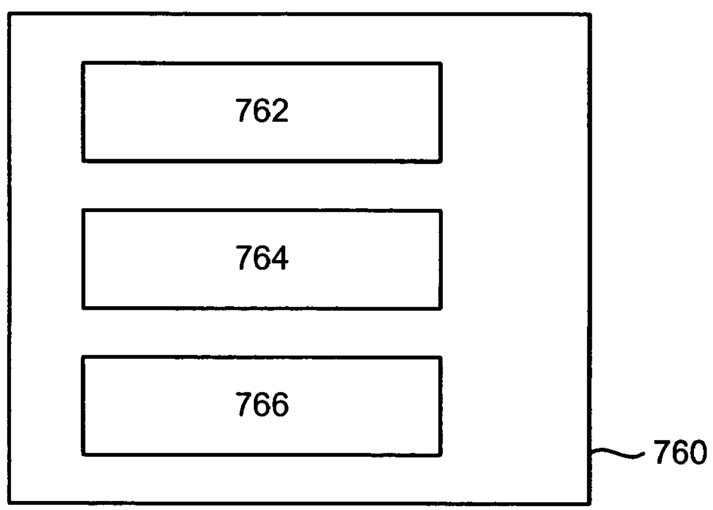

In step 300, it is determined whether the width of the initiator has changed. If so, then in step 302, a change to the column width is determined. In some embodiments, the column widths must be equal to (or slightly greater than) the width of the widest application in the column. In step 304, it is determined whether the new column width is within an allowed range. If not, the change is not allowed (step 306). If the new column width is within the allowed range, then the column width is adjusted, the width of the initiator application is adjusted and the width of the applications in the column are similarly adjusted in step 308. For example, FIG. 11G shows the affect of expanding the width of application 764. In response to expanding (or requesting to expand) application 764, the entire column is expanded so that application 762 and 766 also have their width expanded similarly.

Figure 11H:
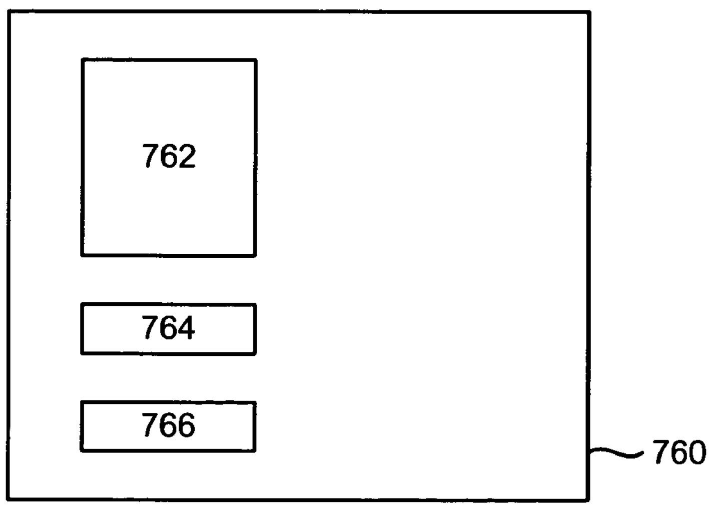

After step 308 or if the width did not change in step 300, the process continues at step 310 of FIG. 10C. In step 310, it is determined whether the vertical size of the initiator has changed. If not, the process of FIG. 10C is completed. If so, then the system calculates the remaining area left in the column. That is, the system determines how much of the column is not occupied by the initiator application. That remaining area is then divided equally among siblings in step 314. In other embodiments, the siblings can divide the area proportionally to their current size. In step 316, the system determines whether the siblings are allowed to adjust as determined in step 314. If not, none of the changes are allowed (step 322). If the siblings can adjust according to the calculations of step 314, the initiator's vertical positioning/size is adjusted in step 318 and the siblings' vertical positioning/sizing is adjusted in step 320. For example, FIG. 11H shows application 762 expanded in the vertical direction. In response to application 762 expanding, applications 764 and 766 automatically (without human intervention) have their heights made smaller.

Figure 10D:
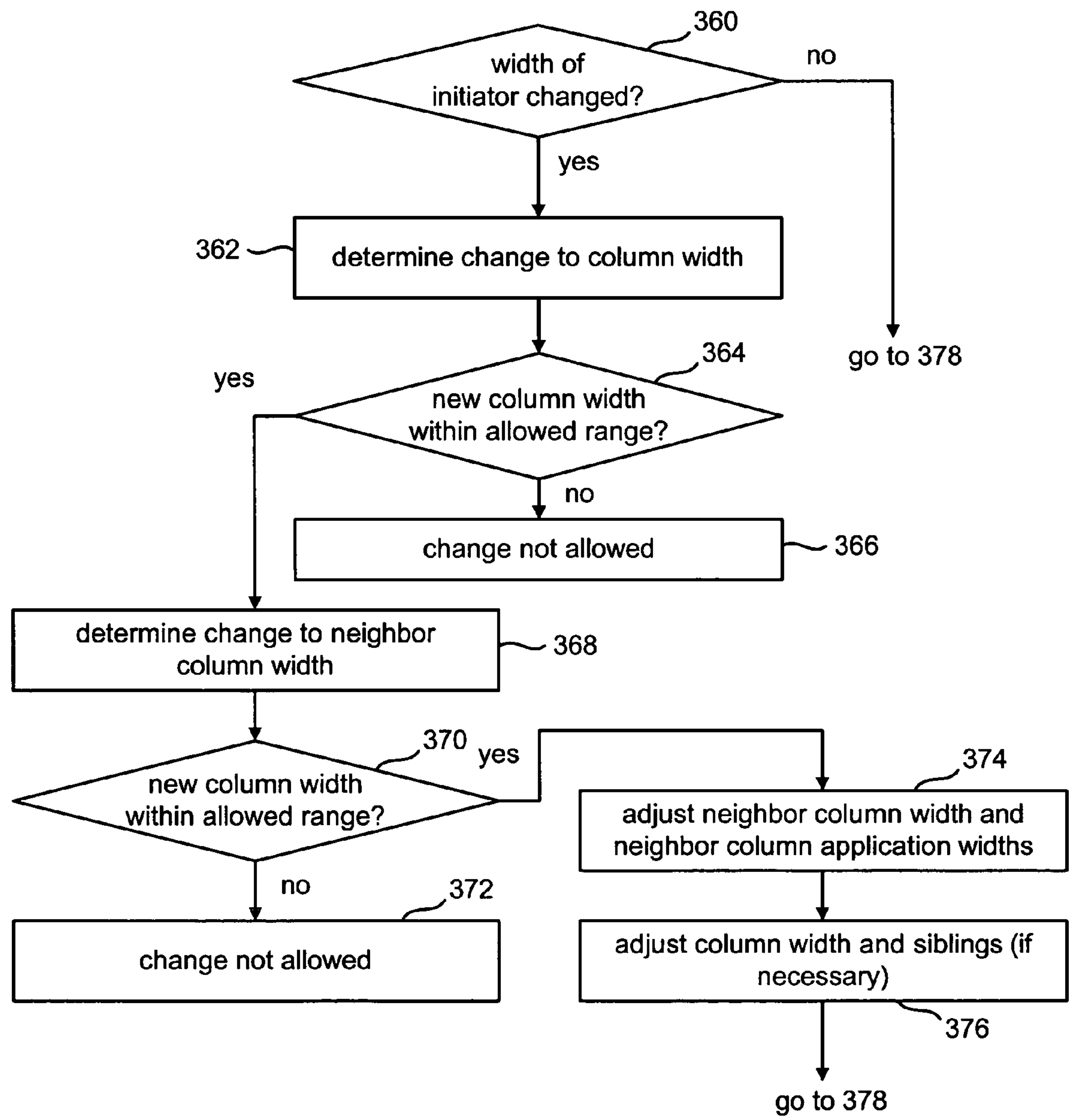
Figure 10D:
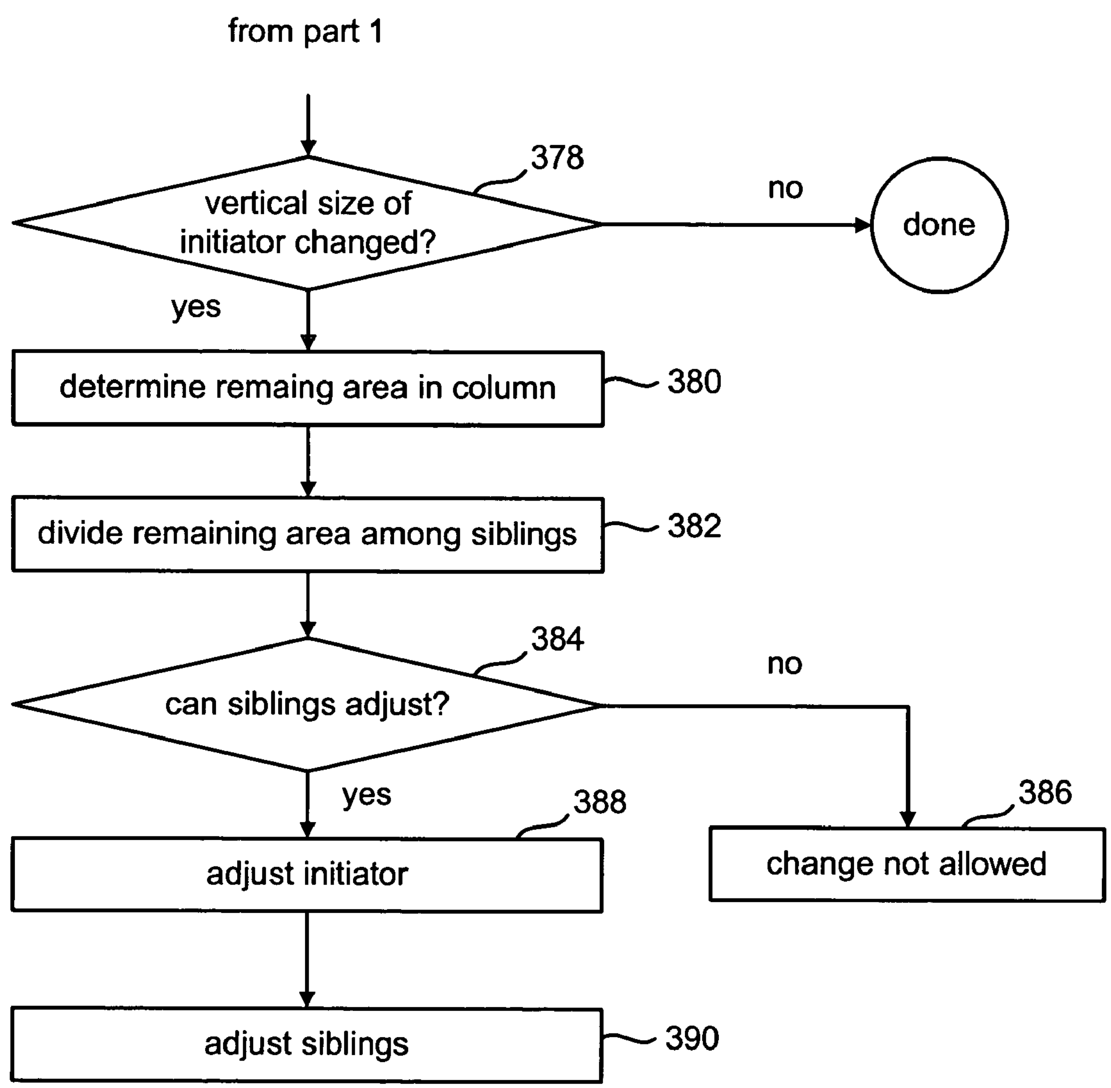

FIG. 10D is a flowchart describing the process performed for a display area that has multiple columns and when the display area has a fixed height. That is, the display area cannot be expanded in the vertical direction. In some embodiments, the display area can also not be expanded in the horizontal direction. In step 360 of FIG. 10D, it is determined whether the width of the initiator application has changed. If not, the process continues as step 378. If the width of the initiator has changed, then in step 362 the system calculates a new column width so that the column width matches the new width of the initiator. In step 364, it is determined whether the new column width is within an allowed range. If not, the changes are not allowed to be made (step 366). If the new column width is within the allowed range, then in step 368 the system determines the change that should be made to the width of the neighbor columns. If the new column widths of the neighbors are not within an allowed range (step 370), then none of the changes are allowed to be made (step 372). If the new column widths of the neighbor columns are within an allowed range, then the neighbors column widths are adjusted and all the applications within the neighbor columns have their width adjusted to match the width of the neighbor columns in step 374. In step 376, the column width for the initiator's column is adjusted, the initiator's size is adjusted as requested, and all the siblings in the initiator's column have their widths adjusted to the same width as the column width (or an appropriate width subtly smaller or subtly larger than the column width as defined by a set of predefined rules).

In step 378, it is determined whether the vertical size of the initiator changed. If not, the process of FIG. 10B is completed. If the vertical size of the initiator has changed, then the system determines the remaining area in the column in step 380. In step 382, the remaining area is divided among the siblings, as discussed above. In step 384, it is determined whether the siblings can adjust as determined in step 382. If not, the changes in the vertical size are not allowed (step 386). If the siblings can adjust (step 384), then the initiator's vertical size is adjusted in step 388 and the sibling's vertical size (or position) is adjusted in step 390.

In some embodiments, two or more applications can be grouped together. A group is a set of applications that have a predefined relationship among them. This predefined relationship can include rules for the sizing of the applications within a group or the positioning of applications within a group. For example, a rule may say that all applications have the same size. Therefore, changing the size of one application will change the size of all applications. Alternatively, a group rule may indicate that all applications must be in a line, on a curve, on a diagonal, or other shape/relationship. Any rule with regard to sizing, spacing or any other display parameters can be made.

Figure 10E:
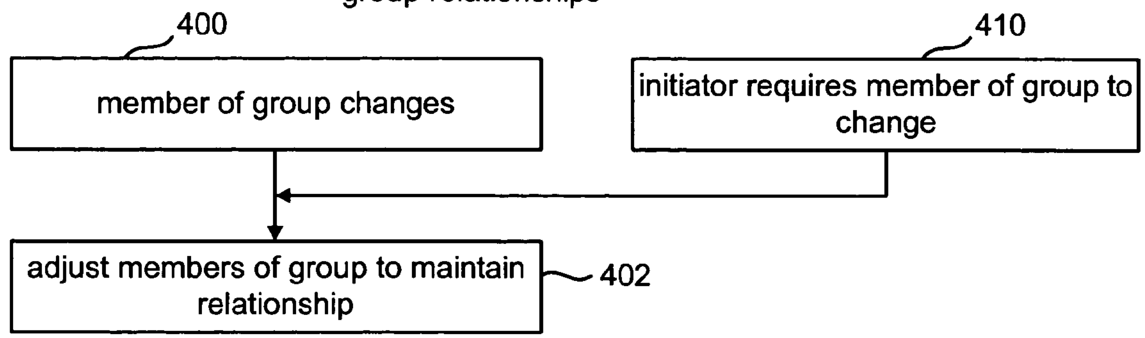
Figure 11I:
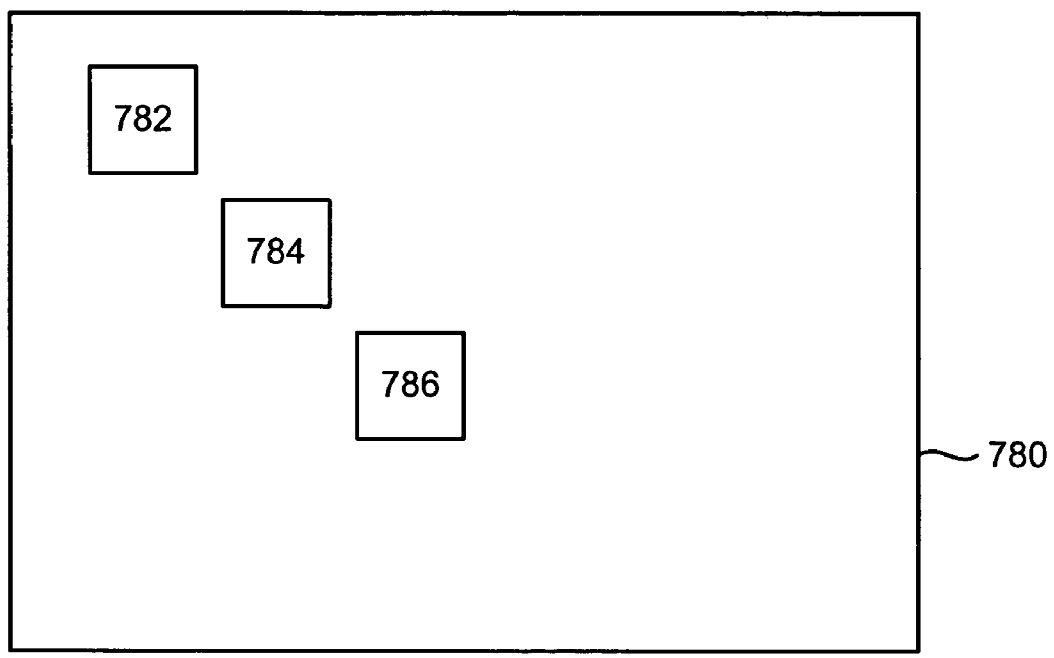
Figure 11J:
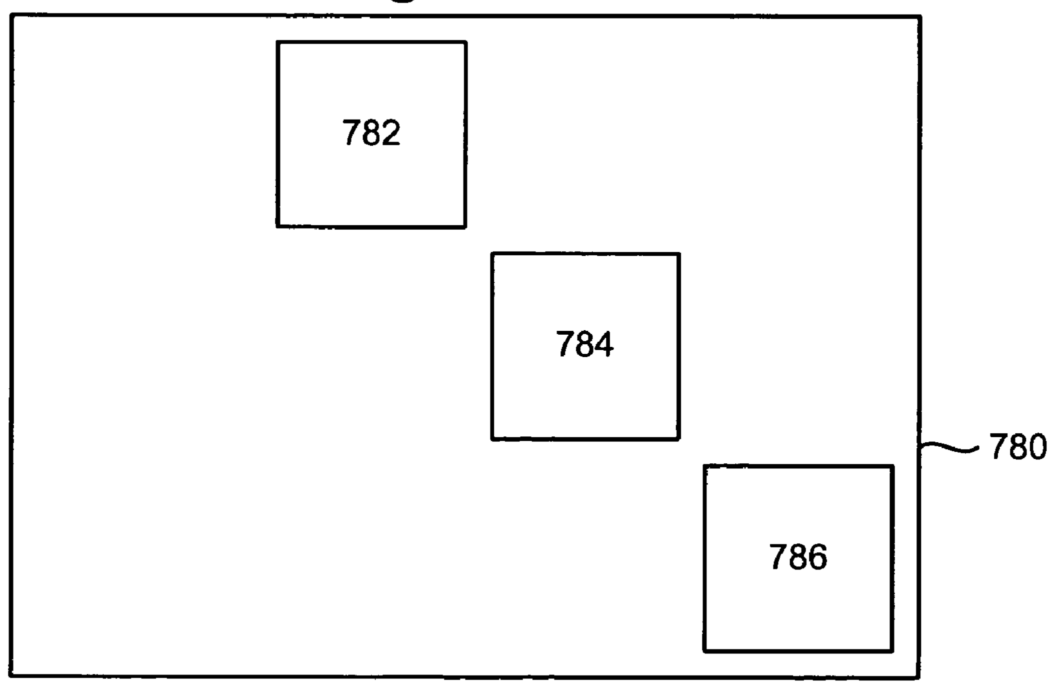

FIG. 10E is a flowchart describing a process for adjusting size and/or positioning among group members. In step 400, a member of a group changes. In step 402, the other members of the group will also change in order to maintain the relationship defined by the set of one or more group rules. Alternatively, the initiator application that has been requested to change may not be part of the group. However, by changing the initiator, it may cause the initiator to then be in an overlapping position with one or more members of the group. Therefore, the system will attempt to change the members of the group to avoid overlapping with the initiator. By changing that members of the group in step 410, it may cause other members of the group to automatically change in step 402 according to the rules of the group. For example, FIG. 11I shows a group of applications 782, 784 and 786. The particular group displayed in FIG. 11I includes rules that the applications should be the same size and positioned on a diagonal. FIG. 11J shows the effect of moving and resizing application 784. This automatically causes the system to move and resize application 782 and application 786 so that all three members of the group have the same size and are positioned along a diagonal.

Figure 10F:
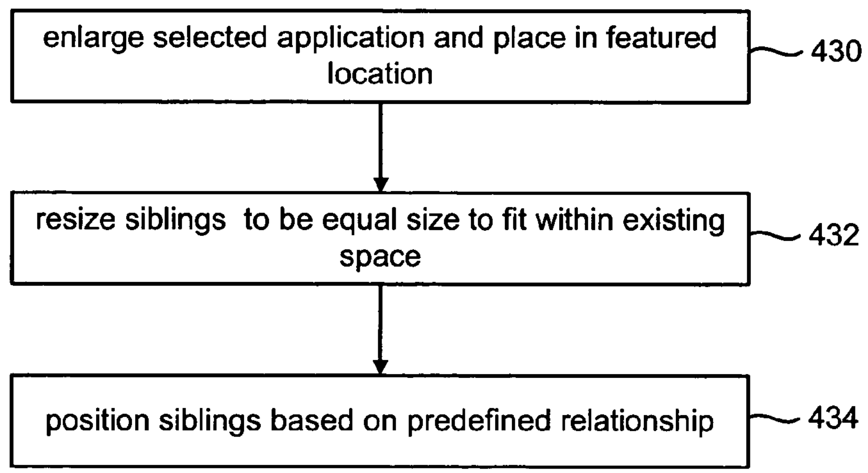
Figure 11K:
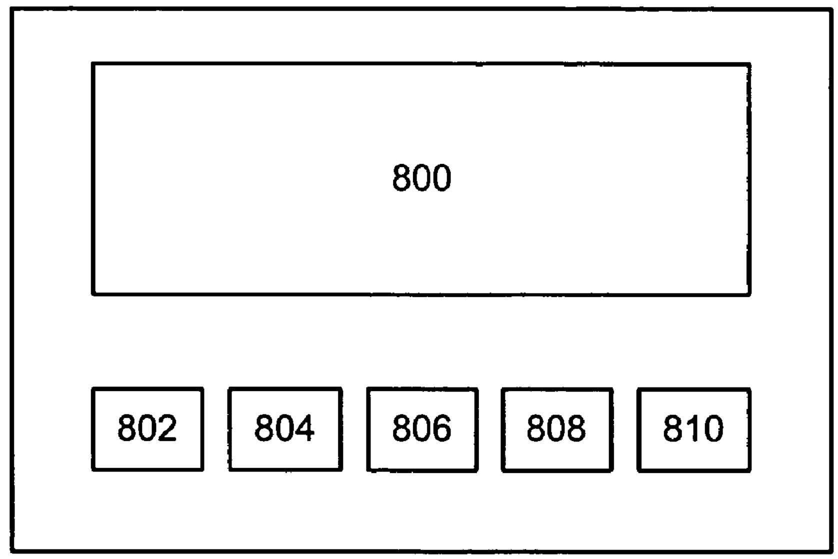
Figure 11L:
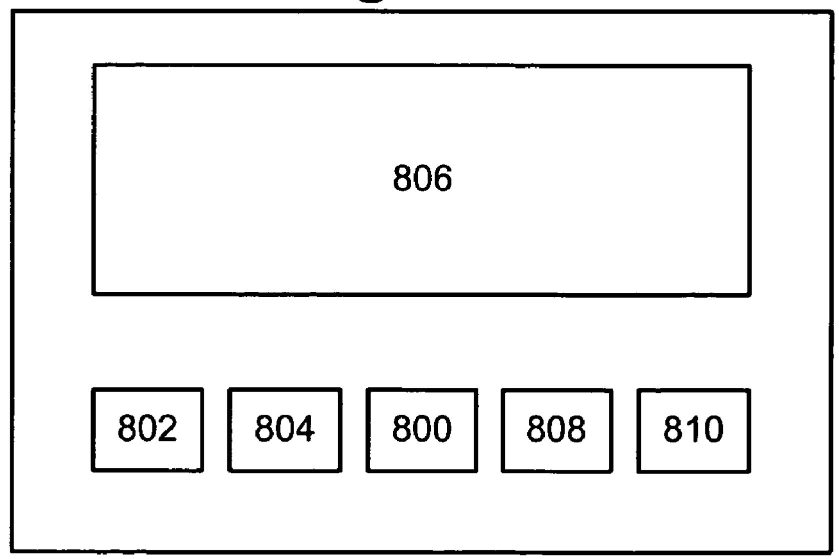

Another embodiment includes displaying a set of applications in a reel layout. For example, FIG. 11K shows a reel layout where application 800 is displayed larger than the other applications and application 800 is in a featured position. The other applications 802, 804, 806, 808 and 810 are positioned below application 800 along a straight horizontal line, where each application is the same size and smaller than application 800. Selecting any of the applications 802-810 will cause the selected application to be resized to a bigger size and replace application 800 in the featured position. Application 800 will then be put in line with the other applications and resized to the same size as the other applications. For example, FIG. 11L contemplates that application 806 was selected to replace application 800. Therefore, application 806 was resized and placed in the featured position. Application 800 was resized to a smaller size and placed in the line of applications below application 806. FIG. 10F shows a flowchart for performing the transformation between FIGS. 11K and 11L. In step 430, the selected application is enlarged and placed in the featured location. In step 432, the unselected siblings are resized to be of equal size within the existing space. In step 434, the siblings are positioned based on the predefined relationship. FIGS. 11K and 11L show the predefined relationship as a straight line below the featured application. In other embodiments, the sibling applications could be on a curve (e.g. wrapped around a circle or other shape), in a different shape, different sizes, etc., and horizontal, vertical, diagonal, etc.

Figure 10G:
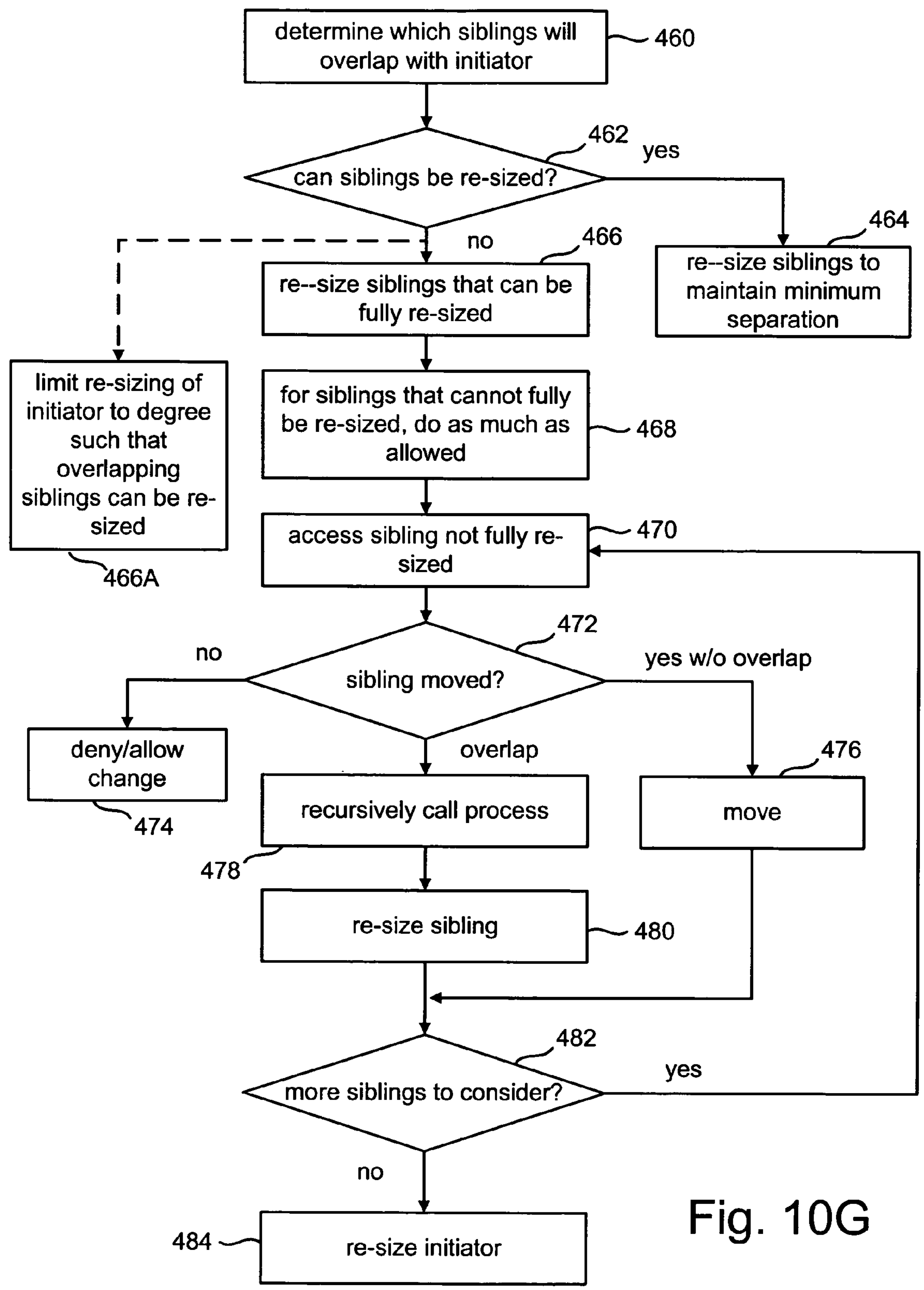
Figure 11M:
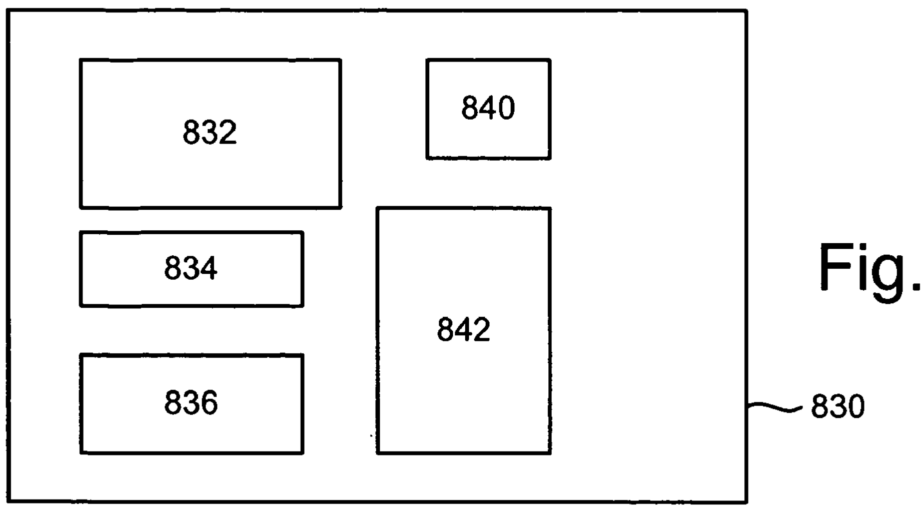
Figure 11N:
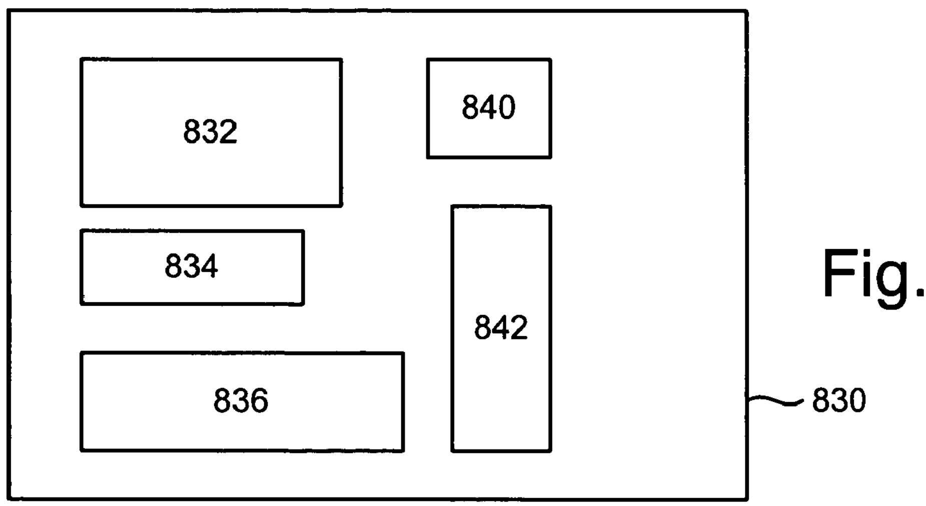

The above-described embodiments contemplate one or more rules or relationships between the various sets of applications. Another embodiment contemplates a display area where applications can be placed anywhere, resized any way and moved anywhere, with no columns or groups. This free-for-all embodiment is described by the flowchart of FIG. 10G. In step 460 of FIG. 10G, it is determined which siblings will overlap with the initiator if the initiator is changed as requested. In one embodiment, the system checks for any overlap. In another embodiment, the system checks for an overlap that is not allowed. As discussed above, some embodiments contemplate that applications may allow certain overlap and not allow other overlap. In step 462, it is determined whether the siblings that will overlap can be resized to avoid the overlap. Some siblings may have minimum dimensions so that they cannot be resized smaller than a minimum dimension. If all the siblings can be resized to avoid the overlap, then in step 464 the siblings are resized in order to maintain the minimum separation required between applications. For example, FIG. 11M shows a display area 830 including applications 832, 834, 836, 840 and 842. FIG. 11N shows what happens when application 836 is expanded in the horizontal direction (width). It is determined in step 460 that application 842 will then overlap with application 836. Therefore, in step 464, application 842 has its width decreased.

If in step 462 it is determined that all of the siblings cannot be resized to avoid the overlap, then in step 466 those siblings that can be resized fully are fully resized. In step 468, those siblings that cannot be filly resized are resized as much as allowed. In step 470, one of the siblings that are not fully resized is accessed. In step 472, it is determining whether that accessed sibling can be moved to avoid the overlap with the initiator. If the sibling cannot be moved because the borders of the display area do not allow it, then the change is denied in step 474. If the sibling can be moved without overlapping with any other siblings, then the sibling is moved in step 476 and the process continues in step 482. If the move causes the sibling application to overlap with other siblings, then the process of FIG. 10G is called recursively in step 478, using the sibling being moved as the initiator. The recessive function should provide for applications neighboring the sibling under consideration to be moved or resized to accommodate moving the sibling. In step 480, the sibling is moved and resized accordingly. In step 482, the process will determine if there are any more siblings to consider. If there are more siblings to consider then the process continues at step 470, otherwise the initiator is resized in step 484.

Figure 11O:
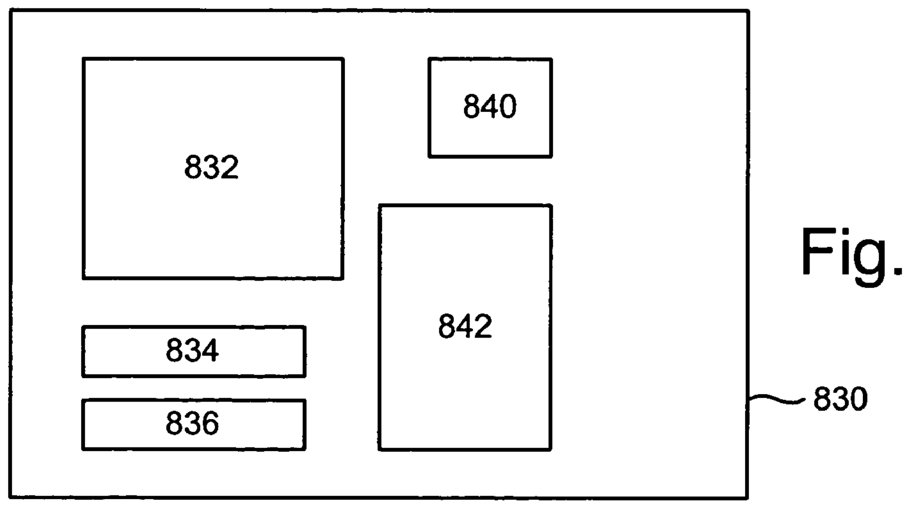

FIG. 11O shows an example of performing the steps 466-484. In the example of FIG. 11O, application 832 was requested to increase. Application 834 cannot be resized sufficiently to allow for application 832 to be resized properly. Thus, application 836 is resized to allow application 834 to be partially resized and moved.

Note that FIG. 10G shows an alternative embodiment (see dashed lines for step 466A). In this alternative embodiment, if all of the siblings cannot be resized (see step 462 of FIG. 10G), then the initiator's resizing is limited to a degree such that all overlapping siblings can be appropriately resized. Thus, the amount that the initiator is allowed to be resized is decreased from what was requested.

Figure 11P:
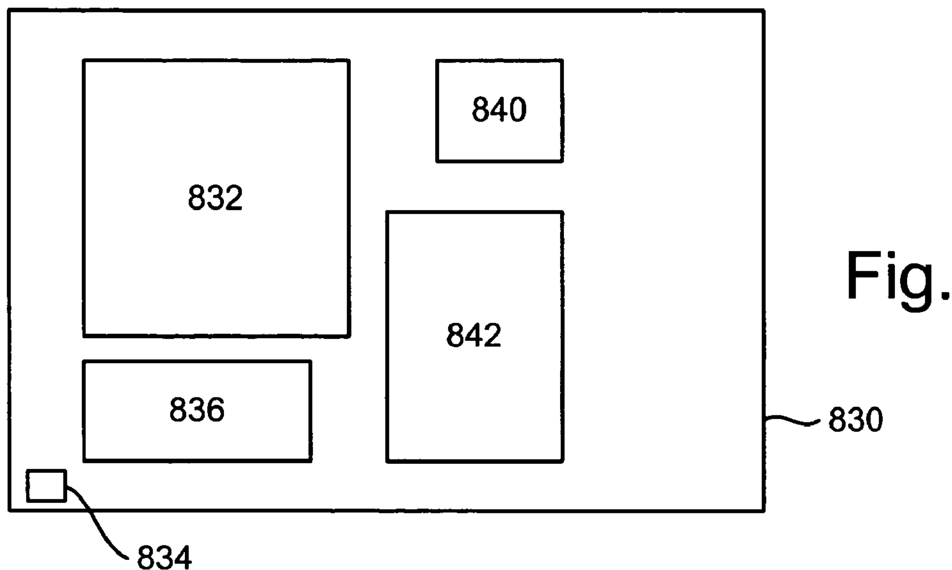

In another alternative embodiment, if a sibling is attempting to be resized to a dimension lower than its minimum size, that sibling will be converted into an icon. For example, FIG. 11P shows a situation where application 832 is expanded to such a degree that sibling application 834 was required to be resized to a vertical dimension below its minimum vertical size. Rather than resizing application 834, the display for application 834 is then converted into an icon and placed in the corner (or other location) of display area 830.

Figure 10H:
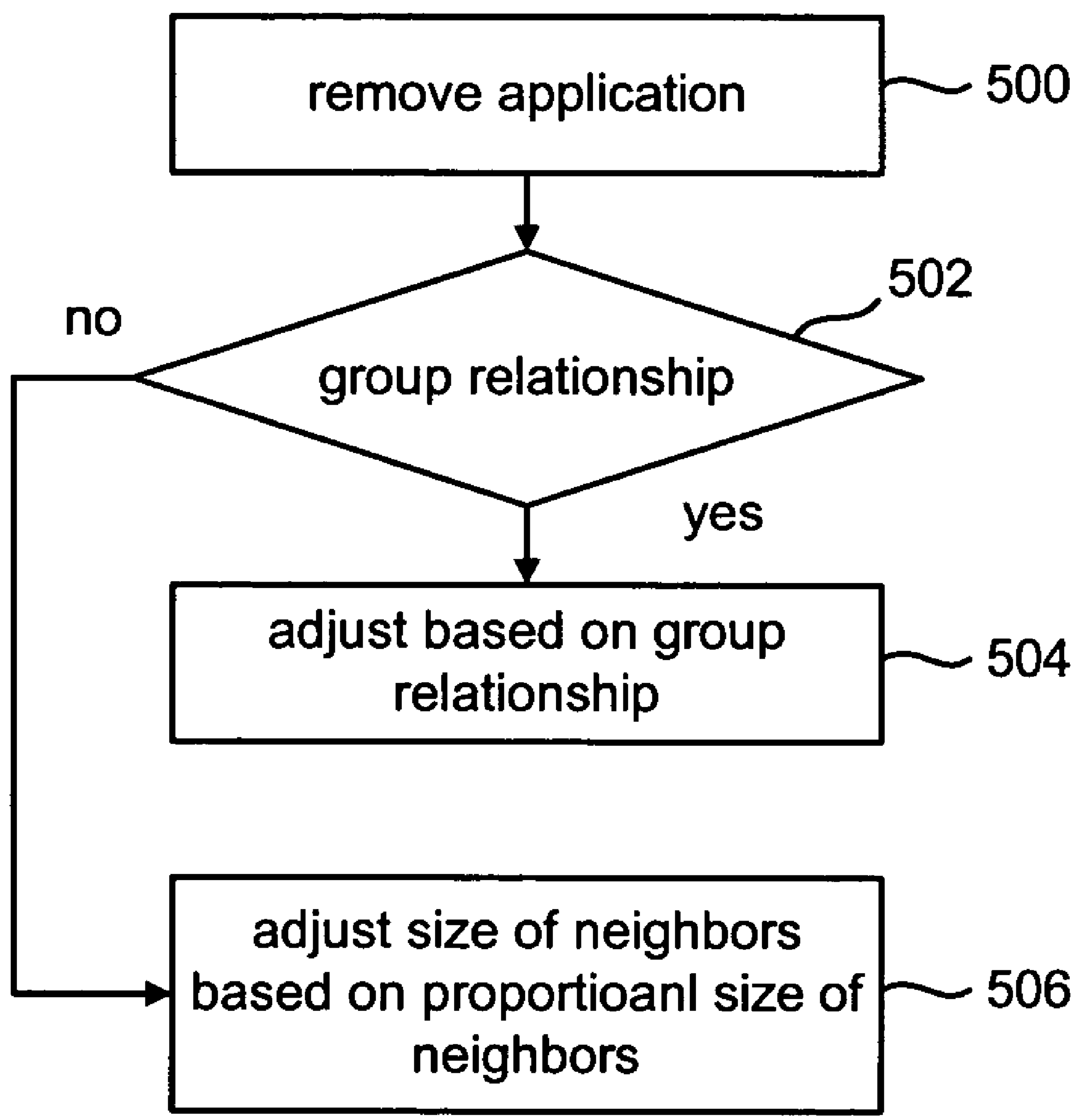
Figure 11Q:
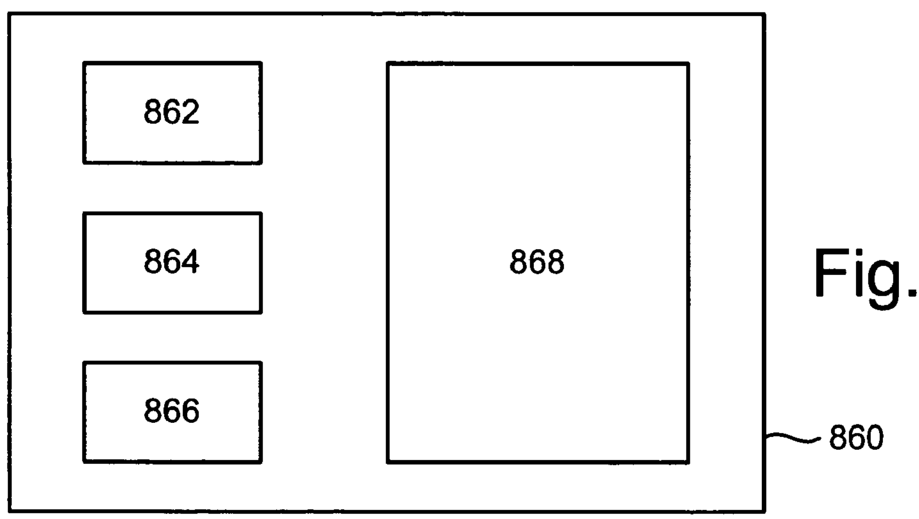
Figure 11R:
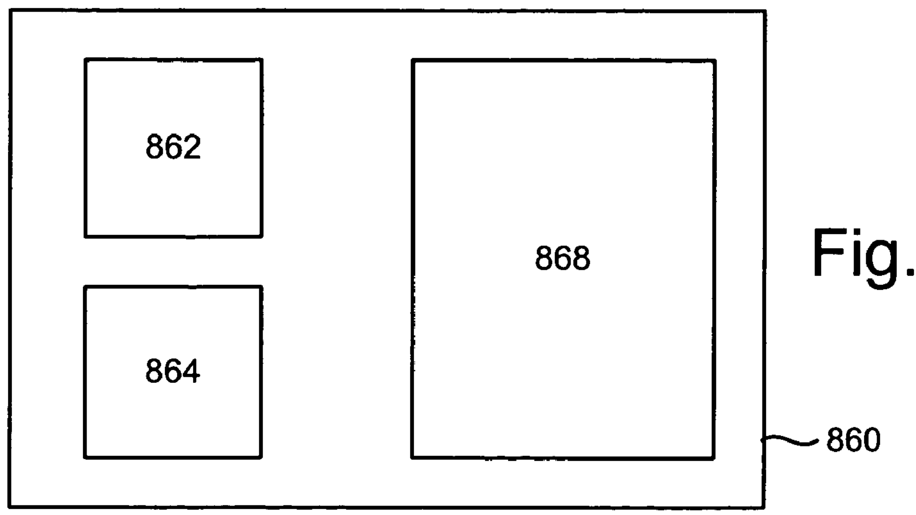

FIG. 10H is a flowchart describing one embodiment's process of removing an application from a display area. For example, FIG. 11Q shows display area 860 with applications 862, 864, 866 and 868. If one of those applications is removed, the other applications can adjust their size to take advantage of the extra room available in the display. In other embodiments, the applications would not resize after one application is removed. In step 500 of FIG. 10H, an application is removed. In step 502, the system determines whether the remaining applications have a group relationship. If so, the remaining applications have their size and/or position adjusted based on that group relationship in step 504. If there is no group relationship, then in step 506 the sizes of the neighbors of the removed application are adjusted based on proportional sizes of those neighbors. That is, the remaining neighbors are increased proportional to their initial size to reduce the available area left behind by the removed application. For example, FIG. 11R shows the affect of removing application 866 from display area 860 (see FIG. 11Q). In that example, applications 862 and 864 are enlarged on an equal basis in order to take advantage of the space left behind by application 866.

Figure 10I:
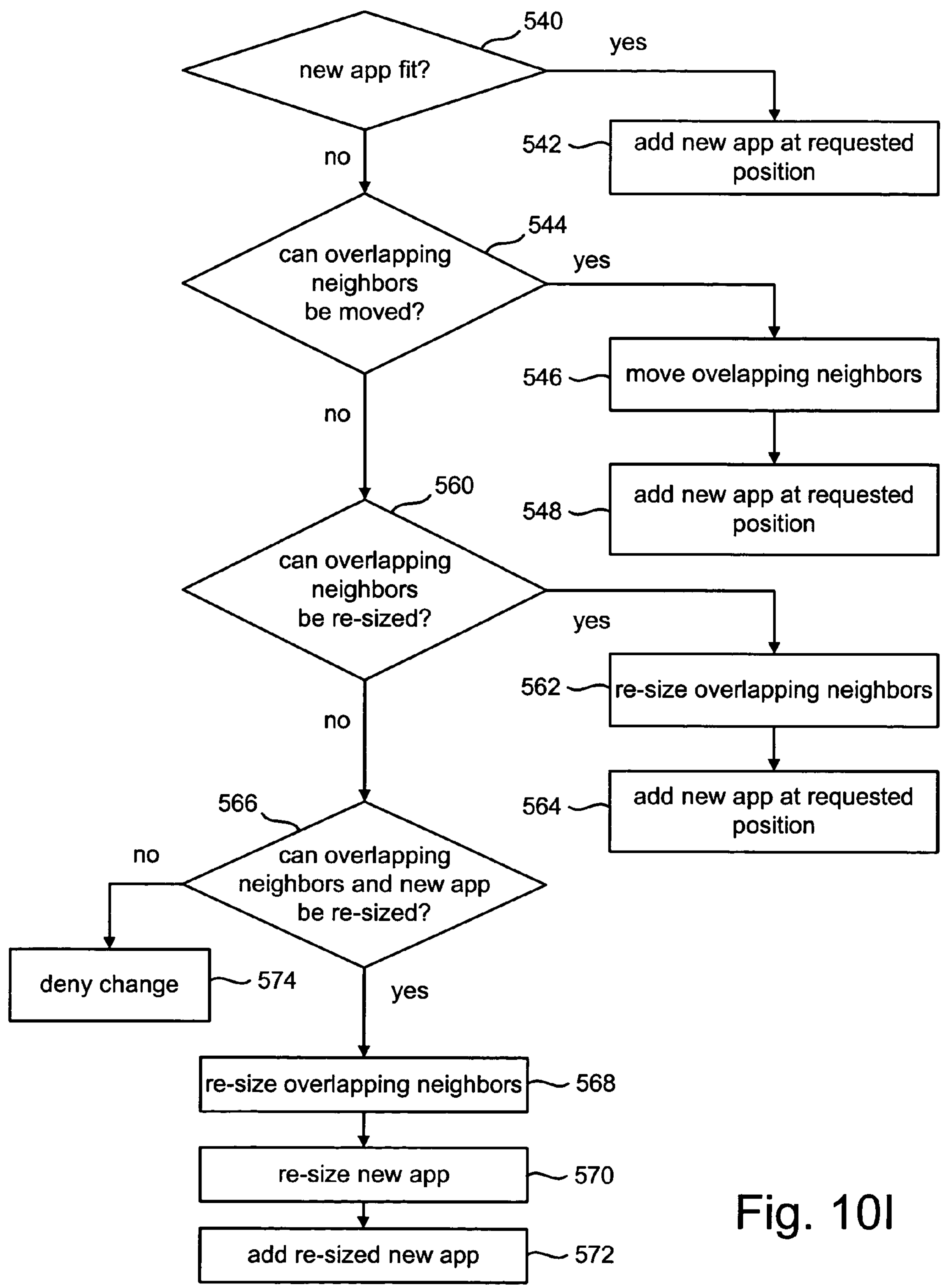
Figure 11S:
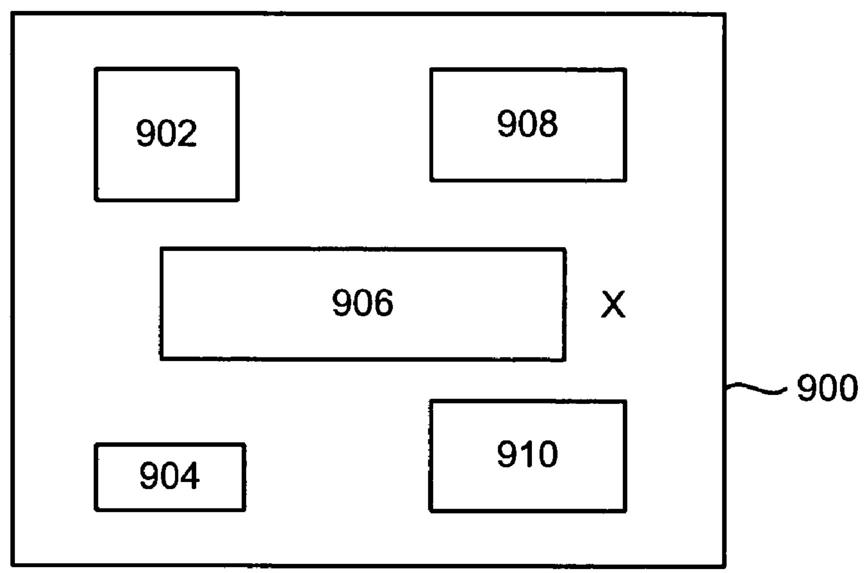
Figure 11T:
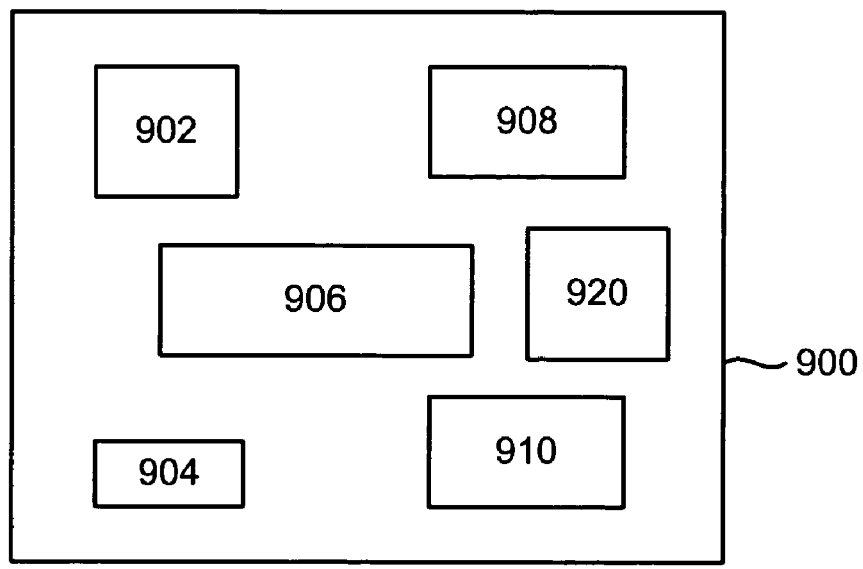

FIG. 10I is a flowchart describing one embodiment of a process performed when an application is added. In step 540, it is determined whether the new application will fit in the requested position without affecting any other applications. If so, that application is added at the requested position in step 542. If not, it is determined whether any of the overlapping neighbors can be moved in step 544. If the overlapping neighbors can be moved, then those overlapping neighbors are moved accordingly in step 546 and the new application is added at the requested position in step 548. If the overlapping neighbors cannot be moved, it is determined whether the overlapping neighbors can be resized in step 560. If so, the overlapping neighbors are appropriately resized in step 562 and the new application is added at the requested position in step 564. If the overlapping neighbors cannot be resized, then in step 566 it is determined whether the overlapping neighbors and the new application can be resized. If not, the change (the addition of the new application) is denied (step 574). If so, then the overlapping neighbors are resized in step 568, the new application is resized in step 570 and the new application is added to the requested position in step 572. In another embodiment, adding the new application could include a combination of resizing some of the overlapping neighbors and moving other overlapping neighbors. FIGS. 11S and 11T provide examples for adding an application. FIG. 11S shows display area 900, which includes applications 902, 904, 906, 908 and 910. It is contemplated that a new application 920 will be added to FIG. 11S at position X in display area 900. Adding application 920 at position X will can application 920 to overlap with application 906. FIG. 11T shows an example where, in order to add application 920, application 906 is resized.

Figure 10J:
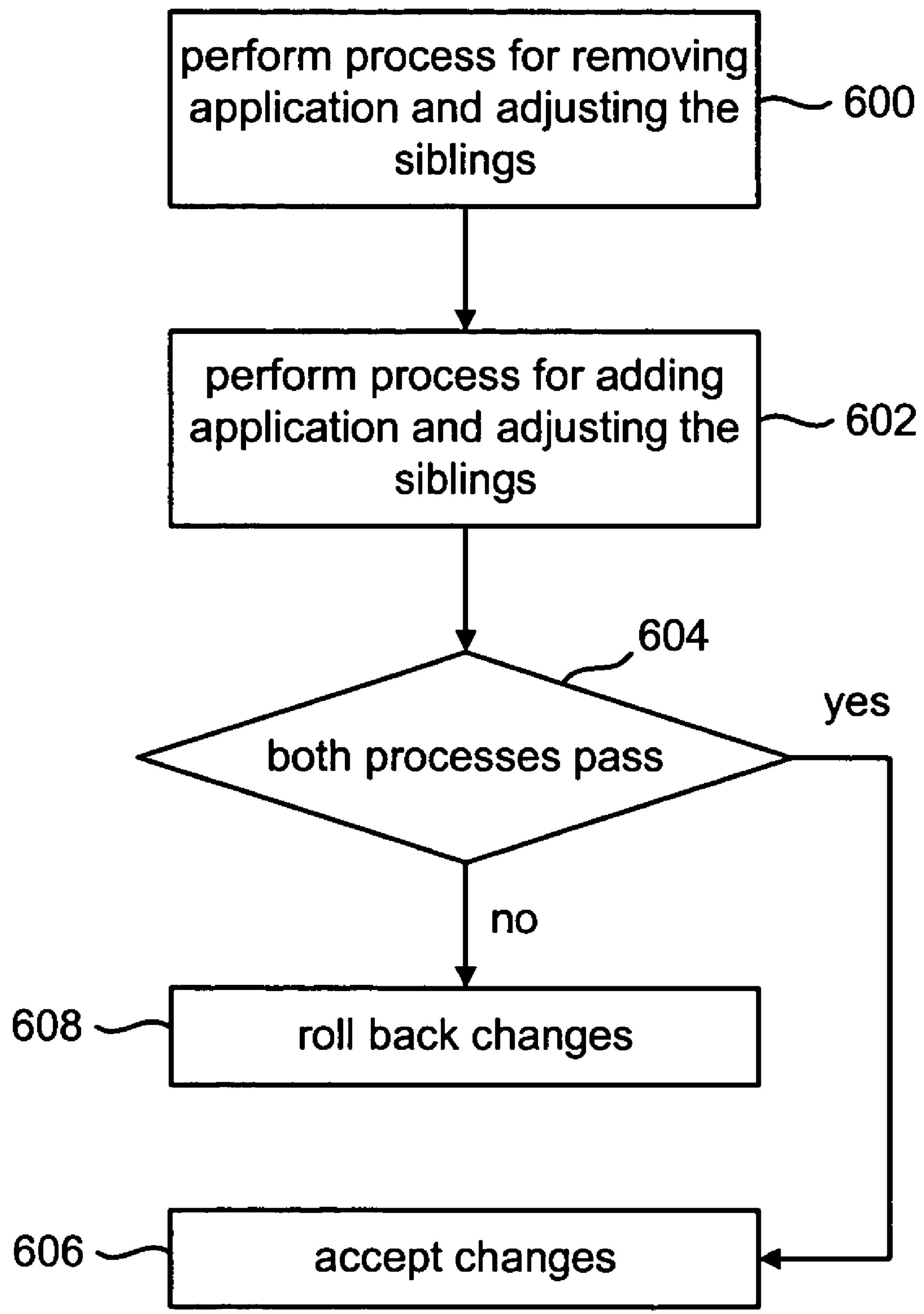

FIG. 10J provides an example of a flowchart describing one embodiment of the process of moving application from one location in a display to another location in a display area. In step 600, the process for removing the application and adjusting the siblings (FIG. 10H) is performed. In step 602 the process for adding an application and adjusting the siblings (FIG. 10D) is performed. In step 604, it is determined whether both processes was performed successfully. If so, the changes are accepted in step 606. If not, the changes are rolled back in step 608.

Although FIGS. 10A-J provide examples for some layouts, other layouts can also be used in accordance with the present invention. The various techniques and concepts for adapting displays of applications described herein are not limited to any type of layout, group, or organization of a user interface.

In some embodiments, an application can be moved or resized using animation. When animation is used, the moving and/or resizing of the effected siblings can occur after the animation of the initiator is completed. Alternatively, the moving and/or resizing of the effected siblings can occur after each pixel change for the initiator, after each step of the animation for the initiator, or after a subset of steps of the animation for the initiator.

It is possible that a first application is requested to be resized or moved and, prior to completing the changes to the first application, a second application is requested to be changed or moved. In one embodiment, when the second application is requested to be changed or moved, the changes to the first application are aborted. In another embodiment, the changes and effects to siblings for the first application are completed, followed by the changes and effects to siblings for the second application. In another embodiment, the systems starts performing the changes and effects to siblings for the first application and then via animation smoothly transforms to the request to change the second application.

Figure 12:
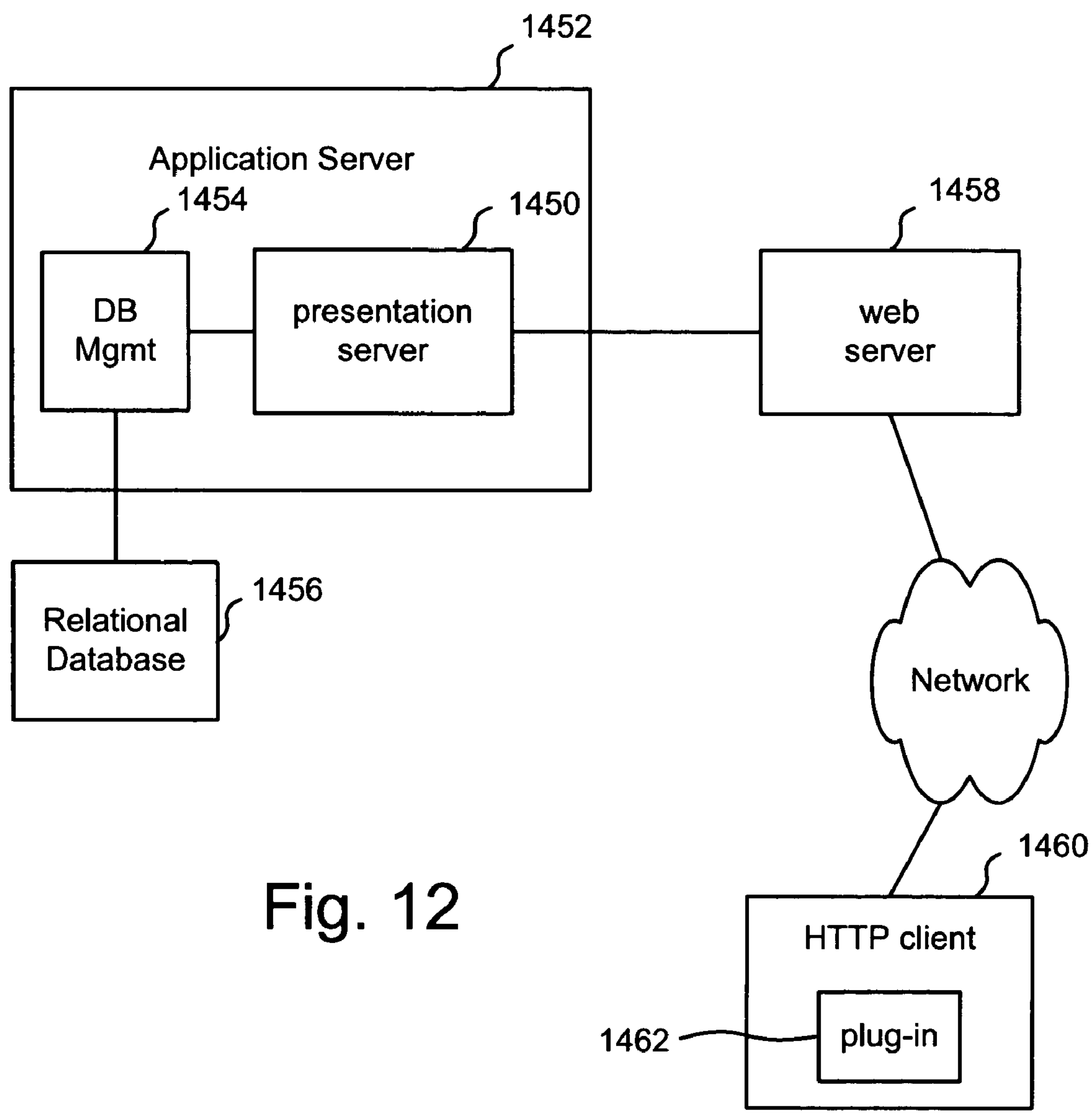
FIG. 12 is a block diagram of one embodiment of a system that can be used to implement the present invention.

One example of a system that can implement the present invention is depicted in FIG. 12. The system of FIG. 12 includes Presentation Server 1450 that can be used to provide content to a client via a network (e.g., via the Internet). Presentation Server 1450 is designed to receive a mark-up language description of a user-interface and dynamically compile that mark-up language description to executable code. In one environment, the mark-up language description is an XML-based language that is designed for describing an application's user interface, along with the connection of that user-interface to various data sources and/or web services. It contains standard user interface primitives like "window," "button," "text," "scroll bar," and so on, as well as syntax for automatically connecting user-interface items with back-end data sources and services. The mark-up language can also include a scripting language for procedural specification of application behavior that is similar to Javascript.

In one embodiment, Presentation Server 1450 generates highly optimized/compressed object code for a given Presentation Renderer. A Presentation Renderer is a software environment, hardware, set of one or more software programs, etc. that can display graphics and play sound. In one embodiment, Presentation Server 1450 is implemented as a Java Servlet that compiles server located mark-up language description files and data into object code. In one implementation, Presentation Server 1450 generates object code for the Macromedia Flash Player. Presentation Server 1450 can be hosted by any standard Java Servlet implementation, including Jakarta Tomcat and J2EE servers like BEA Weblogic and IBM Websphere. FIG. 12 shows Presentation Server 450 hosted in Application Server 1452. Application Server 1452 also includes database management services 1454, which is in communication with relational database 1456. Other types of data stores, other than a relational database, can also be used. Presentation Server 1450 receives requests for content from a client and sends responses via Web Server 1458, which is in communication with clients via a network. That network can be any standard network known in the art, including the Internet, a LAN, a WAN, etc. For example, FIG. 12 shows an HTTP client 1460 (e.g., browser) with plug-in 1462 (e.g., Flash Player) in communication with Presentation Server 1450 via Web Server 1458. In one embodiment, the client is a Macromedia Flash Player embedded in a web client as a plug-in. While the Flash Player is an appropriate vehicle for Presentation Server 1450, many other presentation renderers can also be utilized. In other embodiments, the renderer need not be a plug-in.

Figure 13:
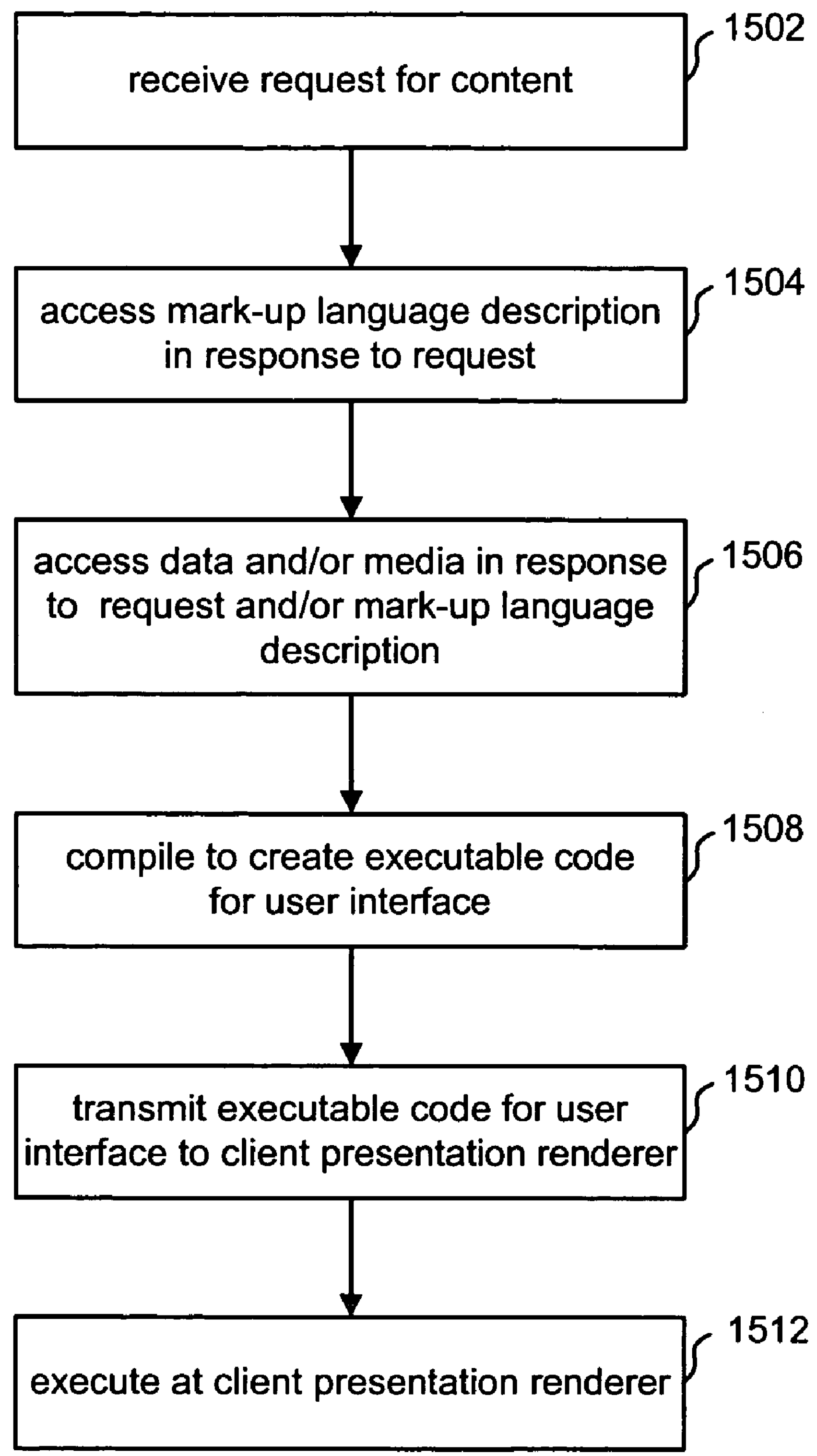
FIG. 13 is a flow chart depicting one embodiment of a process for operating the system of FIG. 12.

FIG. 13 is a flow chart describing one exemplar embodiment of the operation of the system of FIG. 12. In step 1502, the Presentation Server receives a request for content. The content can be a Web page, media, data, an application, or anything else accessible via a network. In step 1504, the Presentation Server accesses a mark-up language description of the content in response to the received request. In some embodiments, other languages are used. In step 1506, the Presentation Server accesses any data and/or media in response to the request or in response to the mark-up language description. In some instances, the request will not require any data or media and, therefore, step 1506 can be skipped. In step 1508, the mark-up language description, data and/or media are complied. In step 1510, the executable code is transmitted to the client. In step 1512, the executable code is executed at the client. The executable code will include the functionality described above for managing application in a display area. More information about a system using a Presentation Server can be found in U.S. patent application Ser. No. 10/092,010, "Presentation Server" filed on Mar. 5, 2002, incorporated herein by reference in its entirety.

The compiler within Presentation Server 1450 can receive code in various different programming languages. In one embodiment, the compiler receives a mark-up language description, for example, an XML-based language description. Other mark-up languages can be used. In addition, programming languages other than mark-up languages can be used.

In one example implementation, the user interface is made up of a series of views. A view is a representation/description of a displayable object (e.g., windows, buttons, sliders, etc.). Views have attributes and attribute modifiers. Attributes define properties of a view, for example, a view's appearance, sound and operation. Attribute modifiers alter attributes in response to events, such as a user input or a change of another attribute for that view or another view. Examples of attribute modifiers include layouts, animators, and constraints. In one embodiment, layouts are used to alter the view's child views. Animators are used to animate the view's appearance. A constraint is an expression that is evaluated repeatedly, when its value changes, such that the property that is bound to it is maintained at the current, rather than the initial, value of the expression. One example of an interface is described in U.S. patent application Ser. No. 10/092,360, "Interface Engine Providing A Continuous User Interface," filed on Mar. 5, 2002, incorporated herein by reference in its entirety.

The form of an attribute is: (attribute name) =$time{expression}, where "expression" is some type of expression that is used to set the value of the attribute and "$time" is a marker that indicates when the expression should be evaluated. There are various values that can be used for "time." In one embodiment, "time" can indicate "immediately," "once," or "always."

In one embodiment of an XML-based source language, the enclosing tag of an application is the canvas element. The canvas element is a view. For example:

```
<canvas>
[application]
</canvas>
```

Below is source code for a first example of an XML-based language that can be used with one embodiment of the present invention:

```
<canvas>
    <view bgcolor="red" width="20" height="20" id="refview"
        onclick="this.animate( 'width' , 10 , 1000 , true )"
        />
    <view bgcolor="blue" width="10" height="20"
        x="$immediately{refview.width}"/>
    <view bgcolor="yellow" width="10" height="20"
        x="$once{refview.width}"/>
    <view bgcolor="gray" width="10" height="$immediately{20}"
        x="$always{refview.width}"/>
</canvas>
```

The above code creates four objects for a user interface. Each object is a view; therefore, the code shows four views. The first view is a red rectangle that initially has a width of 20 pixels, a height of 20 pixels, and an ID of "refyiew." When the rectangle is clicked by a mouse or other pointing device, the width will be animated to increase. A second view is a blue box having a width of 10 pixels and a height of 20 pixels. The x coordinate of the box (the x attribute) has a marker equal to “immediately.” Therefore, the expression “refyiew. width” will be evaluated when the enclosing element is instantiated. The expression defines x to be equal to the width of the object identified as refyiew. A third view is a yellow box having a width of 10 pixels and a height of 20 pixels. The x position of the box has an attribute with a marker indicating “once.” Therefore, the attribute is initialized to the value of expression when the enclosing statement is initialized. The expression defines x to be equal to the width of the view identified as refyiew. The fourth object is a gray box having a width of 10 pixels and a height of 20 pixels. The x coordinate, defined by the x attribute, has a marker equal to “always.” Therefore, any time the width of refyiew (the red box) changes, the x coordinate will also change.

When the above source code is executed, the four objects will initially be displayed on a screen. The blue box will have an x coordinate of zero since the expression was evaluated before the red box was implemented. The yellow box will have an x value equal to the initial width of the red window, which is 20. The gray box will have an initial x position equal to the initial width of the red window, which is 20. As the red window is clicked, the red window will expand its width causing the gray box to change its x position. Thus, the x position of the gray box will continuously track the width of the red rectangle, as the red rectangle grows in width.

More information about the above exemplar XML-based language can be found in U.S. patent application Ser. No. 10/642,360, “Evaluation Expressions in a Software Environment,” filed Aug. 15, 2003, incorporated herein by reference in its entirety. The above example of source code, is just one of many types of source code and software environments that can be used to implement the present invention. Many other types of source code and software environments can also be used. For example, the present invention can be implemented using Java, C++, and many other programming languages. The present invention need not be implemented using a Presentation Server and need not be implemented in a networked environment. For example, a stand alone computing device can be used to implement the present invention. Alternatively, the present invention can be implemented on a mobile computing device, such as a laptop computer, telephone, handheld computing device, etc.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for managing applications, comprising:

displaying a set of software program applications within a web browser, said set of software program applications includes at least a first software program application and a second software program application; changing a display of said first software program application; and automatically changing a display of said second software program application in response to said changing of said display of said first software program application, said first software program application and said second software program application are displayed in a display are that is fixed in size during said steps of changing a display of said first software program application and automatically changing a display of said second software program application.

2. A method according to claim 1, wherein:

said step of changing said display of said first software program application includes changing a size of said display of said first software program application; and said step of changing said display of said second software program application includes changing a position or size of said display of said second software program application.

3. A method according to claim 1, wherein:

said step of changing said display of said first software program application includes changing a position of said display of said first software program application; and said step of changing said display of said second software program application includes changing a position or size of said display of said second software program application.

4. A method according to claim 1, wherein:

said software program applications each are displayed in a display area that is fixed in size.

5. A method according to claim 1, wherein:

said software program applications include a third software program application; and said first software program application and said second software program application are displayed within said third software program application.

6. A method according to claim 1, wherein:

said step of changing a display of said first software program application is performed in response to a user dragging a portion of an object.

7. A method according to claim 1, wherein said step of automatically changing said display of said second software program application comprises:

determining an effect of changing said display of said first software program application on said second software program application;

determining whether said effect is allowed; and changing said display of said second software program application if said effect is allowed.

8. A method according to claim 1, wherein said step of changing a display of said first software program application comprises:

determining whether said changing of said display is allowed.

9. A method according to claim 1, further comprising:

creating user interface items for said set of software program applications;

creating a layout object for a parent software program application;

providing each user interface item with a pointer to call one or more functions if corresponding software program applications change;

providing displays for said user interface items; and running said corresponding software program applications.

10. A method according to claim 1, wherein said step of automatically changing said display of said second software program application comprises:

determining that a vertical positioning of said display of said first software program application has changed; and adjusting vertical positioning of siblings to said first software program application in a vertical relationship with said first software program application.

11. A method according to claim 1, wherein said step of automatically changing said display of said second software program application comprises:

determining that a horizontal positioning of said display of said first software program application has changed; and adjusting horizontal positioning of siblings to said first software program application in a horizontal relationship with said first software program application.

12. A method according to claim 1, wherein said step of automatically changing said display of said second software program application comprises:

determining that a width of said display of said first software program application has changed;

changing a column width of a first display column that includes said display of said first software program application; and changing widths of displays in said first display column based on said column width of said first display column.

13. A method according to claim 1, wherein said step of automatically changing said display of said second software program application comprises:

determining that a width of said display of said first software program application has changed;

changing a column width of a first display column that includes said display of said first software program application;

changing widths of displays in said first display column based on said column width of said first display column;

changing a column width of a second display column that neighbors said first display column; and changing widths of displays in said second display column based on said column width of said second display column.

14. A method according to claim 1, wherein said step of automatically changing said display of said second software program application comprises:

determining that a vertical size of said display of said first software program application has changed;

dividing remaining area among siblings; and adjusting sizes of siblings based on said step of dividing.

15. A method according to claim 1, wherein:

said first software program application is a member of a group, members of said group have a predefined relationship within said group;

said step of automatically changing said display of said second software program application is performed to maintain said predefined relationship.

16. A method according to claim 1, wherein said steps of changing a display of said first software program application and automatically changing said display of said second software program application comprise:

receiving a selection of said first software program application;

enlarging said display of said first software program application and placing said display of said first software program application in a featured location; and resizing and positioning displays of siblings of said first software program application, including said second software program application, to fit within an existing space based on a predefined relationship.

17. A method according to claim 1, wherein said steps of changing a display of said first software program application and automatically changing said display of said second software program application comprise:

determining that said display of said first software program application will overlap with one or more siblings;

determining that displays of said one or more siblings can be resized; and automatically resizing said displays of said one or more siblings to maintain minimum separation.

18. A method according to claim 1, wherein said steps of changing a display of said first software program application and automatically changing said display of said second software program application comprise:

determining that said display of said first software program application will overlap with one or more siblings;

determining that not all displays of said one or more siblings can be resized; and limiting said resizing of said display of said first software program application so that displays of all overlapping siblings can be resized.

19. A method according to claim 1, wherein said steps of changing a display of said first software program application and automatically changing said display of said second software program application comprise:

determining that said display of said first software program application will overlap with one or more siblings;

determining that not all displays of said one or more siblings can be fully resized;

partially resizing displays that cannot be fully resized; and resizing neighbors to displays that cannot be fully resized.

20. A method according to claim 1, wherein said steps of changing a display of said first software program application and automatically changing said display of said second software program application comprise:

removing said display of said first software program application; and adjusting remaining displays of siblings to said first software program application based on a proportional size.

21. A method according to claim 1, wherein said steps of changing a display of said first software program application and automatically changing said display of said second software program application comprise:

determining whether said display of said first software program application fits in an existing free space;

determining whether potentially overlapping neighbors for said first software program application can be moved; and determining whether potentially overlapping neighbors for said first software program application can be resized.

22. A method according to claim 1, wherein said steps of changing a display of said first software program application and automatically changing said display of said second software program application comprise:

determining whether said display of said first software program application fits in an existing free space;

determining whether potentially overlapping neighbors for said first software program application can be moved;

automatically moving said potentially overlapping neighbors, including said display for said second software program application; and adding said display for said first software program application.

23. A method according to claim 1, wherein said steps of changing a display of said first software program application and automatically changing said display of said second software program application comprise:

determining whether said display of said first software program application fits in an existing free space;

determining whether potentially overlapping neighbors for said first software program application can be resized;

resizing said potentially overlapping neighbors, including said display for said second software program application; and adding said display for said first software program application.

24. A method according to claim 1, wherein:

said step of automatically changing said display of said second software program application includes preventing said display of said first software program application from overlapping with said display of said second software program application.

25. A method according to claim 1, wherein:

said step of automatically changing said display of said second software program application includes determining that said display of said second software program application is below a predetermined size threshold and changing said display of said second software program application into an icon.

26. A method according to claim 1, further comprising the steps:

requesting content from a server via a network, said content includes said set of software program applications;

accessing said content in response to said step of requesting by retrieving a mark-up language description of said content and compiling said mark-up language description to produce executable code used to perform said step of displaying, said accessing is performed by said server; and receiving said content from said server, said step of displaying is performed subsequent to said step of receiving said content.

27. A method according to claim 1, wherein:

said step of automatically changing a display of said second software program application includes automatically changing how interactive webpage content for said second software program application is displayed.

28. A method according to claim 1, wherein:

said automatically changing a display of said second software program application includes automatically changing a size or resolution of an image displayed within said second software program application in response to said changing of said display of said first software program application.

29. A method according to claim 1, wherein:

said automatically changing a display of said second software program application includes automatically changing how text is displayed within said second software program application in response to said changing of said display of said first software program application.

30. One or more processor readable storage devices having processor readable code embodied on said processor readable storage devices, said processor readable code for programming one or more processors to perform a method comprising:

displaying a set of interactive applications in a web browser, said set of interactive applications includes at least a first interactive application and a second interactive application; changing a size or position of said first interactive application; and automatically changing a size or position of said second interactive application in response to said changing of said size or position of said first interactive application so that display of said first interactive application does not conflict with display of said second interactive application, display of said first interactive application conflicts with display of said second interactive application if said first interactive application overlaps with display of said second interactive application.

31. One or more processor readable storage devices according to claim 30, wherein said step of automatically changing a size or position of said second interactive application comprises:

determining that a width of said first interactive application has changed;

changing a column width of a first display column that includes said first interactive application; and changing widths of another interactive application in said first display column based on said column width of said first display column.

32. One or more processor readable storage devices according to claim 30, wherein:

said first interactive application and said second interactive application are displayed in a display area that is fixed in size.

33. One or more processor readable storage devices according to claim 30, wherein said step of automatically changing a size or position of said second interactive application comprises:

determining that a width of said first interactive application has changed;

changing a column width of a first display column that includes said first interactive application;

changing widths of one or more other interactive applications in said first display column based on said column width of said first display column;

changing a column width of a second display column that neighbors said first display column; and changing widths of one or more interactive applications in said second display column based on said column width of said second display column.

34. One or more processor readable storage devices according to claim 30, wherein said steps of changing a size or position of said first interactive application and automatically changing a size or position of said second interactive application comprise:

determining that said first interactive application will overlap with one or more siblings;

determining that displays of said one or more siblings can be resized; and automatically resizing said one or more siblings to maintain minimum separation.

35. One or more processor readable storage devices according to claim 30, wherein:

display of said first interactive application conflicts with display of said second interactive application if display of said first interactive application overlaps with display of said second interactive application in a manner that is not allowed.

36. A method for managing software program applications, comprising:

receiving a request to change a display of a first software program application displayed in a display area;

determining how one or more displays for one or more other software program applications should change in response to changing said display of said first software program application in order to avoid conflict with said display of said first software program application;

changing said display of said first software program application; and automatically changing said one or more displays for said one or more other software program applications that should change in response to changing said display of said first software program application in order to avoid conflict with said display of said first software program application including automatically changing how interactive webpage content for said one or more other software program applications is displayed.

37. A method according to claim 36, wherein:

said step of receiving a request includes a user dragging a portion of a window.

38. A method according to claim 36, wherein:

said conflict to be avoided includes avoiding said display of said first software program application overlapping with said one or more displays for said one or more other software program applications that should change.

39. A method according to claim 36, wherein:

said conflict to be avoided includes avoiding said display of said first software program application overlapping, in a manner that is not allowed, with said one or more displays for said one or more other software program applications that should change.

40. A method according to claim 36, wherein:

said step of determining includes determining how to adjust said one or more displays for said one or more other software program applications to avoid said display of said first software program application overlapping with said one or more displays for said one or more other software program applications.

41. A method according to claim 36, further comprising:

determining whether said change to said display of said first software program application is allowed; and denying said change to said display of said first software program application if said change to said display of said first software program application is not allowed.

42. A method according to claim 36, wherein:

said one or more other software program applications includes a second software program application; and said step of changing said one or more displays for said one or more other software program applications includes determining how to change a display of said second software program application to avoid overlapping with said display of said first software program application, determining that said change to said display of said second software program application is not allowed and denying said change to said display of said first software program application.

43. A method according to claim 36, wherein:

said one or more other software program applications includes a second software program application; and said step of changing said one or more displays for said one or more other software program applications includes determining how to change a display of said second software program application to avoid overlapping with said display of said first software program application, determining that said change to said display of said second software program application causes said display of said second software program application to become too small and changing said display of said second software program application to an icon in response to determining that said change to said display of said second software program application causes said display of said second software program application to become too small.

44. A method according to claim 36, wherein:

said one or more other software program applications includes a second software program application;

said first software program application and said second software program application are run within a parent software program application;

said first software program application reports said requested change to said display of said first software program application to said software program parent application; and said parent software program application performs said step of determining.

45. A method according to claim 36, wherein:

said display area is a web browser.

46. A method according to claim 36, wherein said automatically changing how interactive webpage content for said one or more other software program applications is displayed comprises:

automatically changing a size or resolution of an image displayed within said one or more other software program applications.

47. A method according to claim 36, wherein said automatically changing how interactive webpage content for said one or more other software program applications is displayed comprises:

automatically changing how text is displayed within said one or more other software program applications.

48. One or more processor readable storage devices having processor readable code embodied on said processor readable storage devices, said processor readable code for programming one or more processors to perform a method comprising:

receiving a request to change a display of a first software program application;

determining how one or more displays for one or more other software program applications should change in response to changing said display of said first software program application in order to avoid conflict with said display of said first software program application;

changing said display of said first software program application; and automatically changing said one or more displays for said one or more other software program applications that should change in response to changing said display of said first software program application in order to avoid conflict with said display of said first software program application including automatically changing how interactive webpage content for said one or more other software program applications is displayed.

49. One or more processor readable storage devices according to claim 48, wherein:

said step of determining includes determining how to adjust said one or more displays for said one or more other software program applications to avoid said display of said first software program application overlapping with said one or more displays for said one or more other software program applications.

50. One or more processor readable storage devices according to claim 48, wherein said method further comprises:

determining whether said change to said display of said first software program application is allowed; and denying said change to said display of said first software program application if said change to said display of said first software program application is not allowed.

51. One or more processor readable storage devices according to claim 48, wherein:

said one or more other software program applications includes a second software program application; and said step of changing said one or more displays for said one or more other software program applications includes determining how to change a display of said second software program application to avoid overlapping with said display of said first software program application, determining that said change to said display of said second software program application is not allowed and denying said change to said display of said first software program application.

52. An apparatus that can run software program applications, comprising:

means for receiving a request to change a display of a first software program application;

means for determining how one or more displays for one or more other software program applications should change in response to changing said display of said first software program application in order to avoid conflict with said display of said first software program application;

means for changing said display of said first software program application; and means for changing said one or more displays for said one or more other software program applications that should change in response to changing said display of said software program first application in order to avoid conflict with said display of said first software program application including means for changing how interactive webpage content for said one or more other software program applications is displayed.

53. An apparatus that can run software program applications, composing:

an input device;

a display device;

a storage device, said storage device stores code for said software program applications; and a processing device in communication with said input device, said display device and said storage device, said processing device accesses said code in order to display said software program applications within a web browser on said display device, said processing device receives a request to change a display of a first software program application, said processing device automatically changes a display of a second soft-ware program application in response to said request to change said display of said first software program application so that said first software program application does not conflict with said second software program application, said first software program application does not conflict with said second software program application if display of said first software program application does not overlap with display of said second software program application.

54. An apparatus according to claim 53, wherein:

said processing device determines whether said change to said display of said first software program application is allowed and does not change said display of said first software program application if said change to said display of said first software program application is not allowed.

55. An apparatus according to claim 53, wherein:

said processing device determines whether said change to said display of said second software program application is allowed and does not change said display of said first software program application if said change to said display of said second software program application is not allowed.

* * * * *

UNITED STATES PATENT AND TRADEMARK OFFICE

CERTIFICATE OF CORRECTION

PATENT NO. : 7,370,284 B2
APPLICATION NO. : 10/717221
DATED : May 6, 2008
INVENTOR(S) : Andrea It is certified that error appears in the above-identified patent and that said Letters Patent is hereby corrected as shown below:

Col. 24, line 4, Claim Number 53: After "applications" and before "an" delete "composing:" and substitute therefore --comprising:--

Column 24, line 16, Claim Number 53: After "second" and before "program" delete "soft-ware" and substitute therefore --software--

Signed and Sealed this

Twelfth Day of August, 2008

JON W. DUDAS
*Director of the United States Patent and Trademark Office*